US012278426B2

(12) United States Patent
Liu et al.

(10) Patent No.: US 12,278,426 B2
(45) Date of Patent: Apr. 15, 2025

(54) ANTENNA APPARATUS AND ELECTRONIC DEVICE

(71) Applicant: Huawei Technologies Co., Ltd., Shenzhen (CN)

(72) Inventors: Kexin Liu, Shanghai (CN); Dong Yu, Shanghai (CN); Pengfei Wu, Shanghai (CN); Hanyang Wang, Reading (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 18/007,899

(22) PCT Filed: Mar. 30, 2021

(86) PCT No.: PCT/CN2021/084156
§ 371 (c)(1),
(2) Date: Dec. 2, 2022

(87) PCT Pub. No.: WO2021/244115
PCT Pub. Date: Sep. 12, 2021

(65) Prior Publication Data

US 2023/0318172 A1 Oct. 5, 2023

(30) Foreign Application Priority Data

Jun. 3, 2020 (CN) ......................... 202010495093.5

(51) Int. Cl.
*H01Q 5/28* (2015.01)
*H01Q 1/52* (2006.01)
(Continued)

(52) U.S. Cl.
CPC ............... *H01Q 1/521* (2013.01); *H01Q 5/28* (2015.01); *H01Q 5/328* (2015.01); *H01Q 5/335* (2015.01);
(Continued)

(58) Field of Classification Search
USPC .......................................................... 343/725
See application file for complete search history.

(56) References Cited

U.S. PATENT DOCUMENTS

2009/0237319 A1* 9/2009 Fukushima .............. H01Q 9/24 343/793
2017/0117620 A1* 4/2017 Lapushin ............. H01Q 9/0421
(Continued)

FOREIGN PATENT DOCUMENTS

CN 101300714 B 12/2011
CN 105745785 A 7/2016
(Continued)

*Primary Examiner* — Hoang V Nguyen
*Assistant Examiner* — Brandon Sean Woods
(74) *Attorney, Agent, or Firm* — Conley Rose, P.C.

(57) ABSTRACT

An antenna apparatus includes a circuit board and an antenna body. The antenna body includes a first radiator and a second radiator that are indirectly coupled. The first radiator comprises a first stub and a second stub that are opposite to, but do not touch each other to form a first gap, the first stub and the second stub are located on a first side edge of the circuit board, a second gap is configured between the first stub and the first side edge, and also between the second stub and the first side edge. The second radiator is located on the circuit board to form a third gap in-between. A vertical projection of the second radiator is located on the first surface. The first stub and the second stub are electrically connected to reference ground of the circuit board separately.

20 Claims, 24 Drawing Sheets

(51) Int. Cl.

| | |
|---|---|
| ***H01Q 5/328*** | (2015.01) |
| ***H01Q 5/335*** | (2015.01) |
| ***H01Q 5/378*** | (2015.01) |
| ***H01Q 5/50*** | (2015.01) |
| ***H01Q 9/42*** | (2006.01) |

(52) U.S. Cl.
CPC ............... *H01Q 5/378* (2015.01); *H01Q 5/50* (2015.01); *H01Q 9/42* (2013.01)

(56) References Cited

U.S. PATENT DOCUMENTS

| | | | | |
|---|---|---|---|---|
| 2017/0207515 | A1* | 7/2017 | Li | H04B 1/3827 |
| 2019/0097319 | A1* | 3/2019 | Hsieh | H01Q 1/243 |

FOREIGN PATENT DOCUMENTS

| | | | | |
|---|---|---|---|---|
| CN | 105958190 A | | 9/2016 | |
| CN | 105428787 B | | 4/2018 | |
| CN | 109361062 A | | 2/2019 | |
| CN | 109560386 A | | 4/2019 | |
| CN | 110391491 A | * | 10/2019 | G04G 17/04 |
| CN | 110931956 A | | 3/2020 | |
| CN | 111129728 A | | 5/2020 | |
| EP | 3379647 A1 | | 9/2018 | |
| GB | 2512734 B | | 2/2017 | |
| GB | 2533358 B | | 9/2018 | |
| JP | 5389088 B2 | | 1/2014 | |

* cited by examiner

ANTENNA APPARATUS AND ELECTRONIC DEVICE

CROSS-REFERENCE TO RELATED APPLICATIONS

This is a U.S. National Stage of International Patent Application No. PCT/CN2021/084156 filed on Mar. 30, 2021, which claims priority to Chinese Patent Application No. 202010495093.5 filed on Jun. 3, 2020, both of which are hereby incorporated by reference in their entireties.

TECHNICAL FIELD

This application relates to the field of antenna technologies, and in particular, to an antenna apparatus and an electronic device.

BACKGROUND

With development of communications technologies and electronic devices, especially with a fifth-generation mobile communications technology (5G) era coming, electronic devices need to support more antennas and frequency bands, to implement a high transmission rate required by 5G. For example, a multiple-input multiple-output (multiple-input multiple-output, MIMO) technology is used in an electronic device, and a space diversity gain can effectively improve channel reliability, to reduce a channel bit error rate, and finally increase a data rate. However, in a MIMO antenna structure, a quantity of antennas is in direct proportion to space occupied by the antennas. Therefore, excessively-limited space inside the electronic device limits both a frequency band that can be covered and performance of a MIMO antenna.

To resolve the foregoing problem, in the conventional technology, two different antenna modes can be excited on a same antenna, to form dual antennas with a specific isolation. However, each antenna mode can cover only one frequency band, and consequently, a bandwidth of the foregoing antenna is limited.

SUMMARY

Embodiments of this application provide an antenna apparatus and an electronic device, to resolve a problem that an antenna bandwidth is limited because a small quantity of excitation modes are generated when an antenna is excited by one excitation end.

To achieve the foregoing objective, this application uses the following technical solutions.

According to one aspect of embodiments of this application, an antenna apparatus is provided. The antenna apparatus includes a circuit board and an antenna body. The circuit board includes a first surface and a first side edge. The antenna body includes a first radiator and a second radiator. The first radiator includes a first stub and a second stub. A first end of the first stub and a first end of the second stub are opposite to, but do not touch each other, and a first gap is configured between the first end of the first stub and the first end of the second stub. The first stub and the second stub are located on the first side edge of the circuit board. A second gap is configured between the first stub and the first side edge of the circuit board, and the second gap is configured between the second stub and the first side edge. The second radiator is located on the circuit board, a third gap is configured between the second radiator and the first surface of the circuit board, and a vertical projection of the second radiator is located on the first surface of the circuit board. A second end of the first stub and a second end of the second stub are electrically connected to reference ground of the circuit board separately. The first radiator is indirectly coupled to the second radiator. Because the first radiator and the second radiator are indirectly coupled, when one excitation end is used to excite the first radiator to generate one radiation mode, a current generated on the first radiator may be coupled to the second radiator, so that the second radiator can generate another radiation mode. In this way, a same excitation end may excite the antenna body to generate two radiation modes. In this case, when a quantity of excitation ends is increased, a quantity of radiation modes is also increased. Therefore, compared with a solution in which only two different antenna modes can be excited on a same antenna, the solution provided in this embodiment of this application can help the antenna body obtain a wider bandwidth.

Optionally, there is a distance D between the first radiator and the second radiator, where D≤7 mm. In this way, the distance between the first radiator and the second radiator is short, so that a current on the first radiator can be easily coupled to the second radiator.

Optionally, the antenna apparatus further includes a first feed circuit and a second feed circuit. The first feed circuit is electrically connected to the first stub and the second stub. The first feed circuit is configured to: transmit equal-amplitude out-of-phase excitation signals to the first stub and the second stub respectively, and excite the antenna body as a first antenna to generate a first radiation mode and a second radiation mode. A main radiator in the first radiation mode is the first radiator. A main radiator in the second radiation mode is the second radiator. The second feed circuit is electrically connected to the first stub and the second stub. The second feed circuit is configured to: transmit a same excitation signal to the first stub and the second stub, and excite the antenna body as a second antenna to generate a third radiation mode. A main radiator in the third radiation mode is the first radiator. In conclusion, in the antenna structure provided in this embodiment of this application, the first feed circuit can excite the antenna body as the first antenna to generate the first radiation mode and the second radiation mode. In addition, the second feed circuit can excite the antenna body as the second antenna to generate the third radiation mode, to form dual antennas. In this way, the antenna body may simultaneously work in at least three radiation modes as dual antennas, to transmit more data. Therefore, compared with a solution in which only two different antenna modes can be excited on a same antenna, the solution provided in this embodiment of this application can help the antenna body obtain a wider bandwidth.

Optionally, the circuit board includes a first excitation end. The first feed circuit includes a signal conversion circuit and a first configuration circuit. The signal conversion circuit has an input end, a first output end, and a second output end. The input end is electrically connected to the first excitation end, the first output end is electrically connected to the first stub, and the second output end is electrically connected to the second stub. The signal conversion circuit is configured to: convert a signal provided by the first excitation end into a first excitation signal and a second excitation signal that are equal-amplitude out-of-phase, transmit the first excitation signal to the first stub through the first output end, and transmit the second excitation signal to the second stub through the second output end. The signal conversion circuit may be a balun chip. The balun chip has a small packaging size, in the antenna structure, so that a single-end signal provided by the first excitation end can be converted into two equal-amplitude out-of-phase signals by using the balun chip with a small packaging size, and a size of the antenna structure can be reduced. In addition, a first output end and a second output end of the balun chip have a high balance degree, so that the first excitation signal and the second excitation signal can meet an equal-amplitude out-of-phase requirement, to effectively excite the antenna body to generate the first radiation mode and the second radiation mode. In addition, a first configuration circuit is electrically connected between the first output end and the second output end of the signal conversion circuit, and configured to tune a resonance frequency and a bandwidth of the first radiator in the first radiation mode, so that a resonance frequency and a bandwidth of the antenna body can be tuned based on a requirement.

Optionally, the first configuration circuit includes a first capacitor and a second capacitor. A first end of the first capacitor is electrically connected to the first output end of the signal conversion circuit, and a second end of the first capacitor is electrically connected to the first stub. A first end of the second capacitor is electrically connected to the second output end of the signal conversion circuit, and a second end of the second capacitor is electrically connected to the second stub. The first capacitor and the second capacitor are configured to perform feeding matching. When capacitance values of the first capacitor and the second capacitor are larger, a resonance frequency of the antenna body is lower when the first feed circuit excites the antenna body to generate the first radiation mode; or when capacitance values of the first capacitor and the second capacitor are smaller, a resonance frequency of the antenna body is higher.

Optionally, the first configuration circuit further includes at least two first tuning components. The first tuning component is electrically connected between a second end of the first capacitor (or the first stub) and a second end of the second capacitor (or the second stub). The first tuning component includes a first inductor and a first radio frequency switch that are connected in series. In this way, a quantity of first inductors connected in parallel in the first configuration circuit may be controlled by controlling a quantity of first radio frequency switches. When the quantity of first inductors connected in parallel in the first configuration circuit is larger, inductive reactance between the first stub and the second stub is lower, and a resonance frequency of the antenna body in the first radiation mode is higher; or when the quantity of first inductors connected in parallel in the first configuration circuit is smaller, inductive reactance between the first stub and the second stub is higher, and a resonance frequency of the antenna body in the first radiation mode is lower.

Optionally, the antenna apparatus further includes a second configuration circuit. The second configuration circuit is electrically connected to a center of the second radiator and the reference ground of the circuit board, the second feed circuit is further configured to excite the antenna body to generate a fourth radiation mode, and a main radiator in the fourth radiation mode is the second radiator. The second configuration circuit is configured to tune a resonance frequency and bandwidth of the second radiator in the fourth radiation mode. The second configuration circuit includes at least two second tuning components. The second tuning component is electrically connected between the center of the second radiator and the reference ground of the circuit board. Each second tuning component includes a second inductor and a second radio frequency switch that are connected in series. In this way, a quantity of second inductors connected in parallel in the second configuration circuit may be controlled by controlling a quantity of second radio frequency switches. When the quantity of second inductors connected in parallel in the second configuration circuit is larger, inductive reactance between the second radiator and the reference ground of the PCB is lower, and the resonance frequency of the antenna body in the fourth radiation mode is higher; or when the quantity of second inductors connected in parallel in the second configuration circuit is smaller, inductive reactance between the second radiator and the reference ground of the PCB is higher, and the resonance frequency of the antenna body in the fourth radiation mode is lower.

Optionally, the first configuration circuit includes a third capacitor and a fourth capacitor. A first end of the third capacitor is electrically connected to the first output end of the signal conversion circuit, and a second end of the third capacitor is electrically connected to the first stub. A first end of the fourth capacitor is electrically connected to the second output end of the signal conversion circuit, and a second end of the fourth capacitor is electrically connected to the second stub. When capacitance values of the third capacitor and the fourth capacitor are higher, the resonance frequency of the antenna body in the first radiation mode is lower; or when capacitance values of the third capacitor and the fourth capacitor are smaller, the resonance frequency of the antenna body in the first radiation mode is higher.

Optionally, the antenna apparatus further includes a second configuration circuit. The second configuration circuit is electrically connected to the center of the second radiator and the reference ground of the circuit board, the second teed circuit is further configured to excite the antenna body to generate a fourth radiation mode, and a main radiator in the fourth radiation mode is the second radiator. The second configuration circuit is configured to tune a resonance frequency and a bandwidth of the second radiator in the fourth radiation mode. The second configuration circuit includes a fifth capacitor and/or a third inductor. A first end of the fifth capacitor is electrically connected to the center of the second radiator, and a second end of the fifth capacitor is grounded to the reference ground of the circuit board. A first end of the third inductor is electrically connected to the center of the second radiator, and a second end of the third inductor is grounded to the reference ground of the circuit board. In a case the antenna body works in the fourth radiation mode, when a capacitance value of the fifth capacitor or an inductance value of the third inductor is larger, the resonance frequency of the antenna body in the fourth radiation mode is lower; or when a capacitance value of the fifth capacitor or an inductance value of the third inductor is smaller, the resonance frequency of the antenna body in the fourth radiation mode is higher.

Optionally, the first stub and the second stub are both L-shaped, and the first stub and the second stub are disposed symmetrically with respect to a center of the first gap. In this case, when the antenna body is in the third radiation mode, in the first radiator that is used as a main radiator, a current distributed on the first stub and a current distributed on the second stub have flow directions opposite to each other, and are symmetrically distributed with respect to the center of the first gap. This helps improve isolation of dual antennas.

Optionally, the second radiator is strip-shaped, and the first stub and the second stub are symmetrically disposed with respect to the center of the second radiator. This helps improve isolation of dual antennas.

Optionally, a current on the antenna body in the first radiation mode is orthogonal to currents on the antenna body in the third radiation mode and the fourth radiation mode and a radio wave on the antenna body in the first radiation mode is orthogonal to radio waves on the antenna body in the third radiation mode and the fourth radiation mode. Therefore, isolation between an antenna in the first radiation mode and an antenna in the third radiation mode and the fourth radiation mode is high. A current on the antenna body in the second radiation mode is orthogonal to currents on the antenna body in the third radiation mode and the fourth radiation mode; and a radio wave on the antenna body in the second radiation mode is orthogonal to radio waves on the antenna body in the third radiation mode and the fourth radiation mode. Therefore, isolation between an antenna in the second radiation mode and an antenna in the third radiation mode and the fourth radiation mode is high.

Optionally, in the first radiation mode, a flow direction of a current distributed on the first stub is the same as a flow direction of a current distributed on the second stub. In the second radiation mode, flow directions of currents distributed on the second radiator are the same. In the third radiation mode, a flow direction of a current distributed on the first stub is opposite to a flow direction of a current distributed on the second stub relative to the first gap. In the fourth radiation mode, flow directions of currents distributed on the second radiator are opposite to each other relative to the center of the second radiator. Therefore, isolation between the first antenna in the first radiation mode and the second antenna in the third radiation mode and the fourth radiation mode is high. In addition, isolation between the first antenna in the second radiation mode and the second antenna in the third radiation mode and the fourth radiation mode is high, so that dual antennas with high isolation are formed.

Optionally, a frequency range covered by the first radiation mode, a frequency range covered by the second radiation mode, a frequency range covered by the third radiation mode, and a frequency range covered by the fourth radiation mode are at least partially different from each other. In this way, when the antenna body works in the four radiation modes at the same time, because frequency ranges covered by the four radiation modes may be different, the antenna body can obtain a wider bandwidth, to transmit more data.

Optionally, the antenna apparatus further includes an antenna chassis. The antenna chassis is disposed on the first surface of the circuit board. A height of the antenna chassis is the same as the third gap. The second radiator is disposed on a surface of a side that is of the antenna chassis and that is away front the first surface of the circuit board. A height direction of the antenna chassis is perpendicular to the first surface of the circuit board. A material of the antenna chassis includes an insulation material. The antenna chassis is configured to support the second radiator, so that the third gap is configured between the second radiator and the PCB.

According to another aspect of embodiments of this application, an electronic device is provided, including a metal rim and any antenna apparatus described above. The first radiator of the antenna apparatus is a part of the metal rim. The electronic device has a same technical effect as the antenna apparatus provided in the foregoing embodiment. Details are not described herein.

REFERENCE NUMERALS

Figure 1:
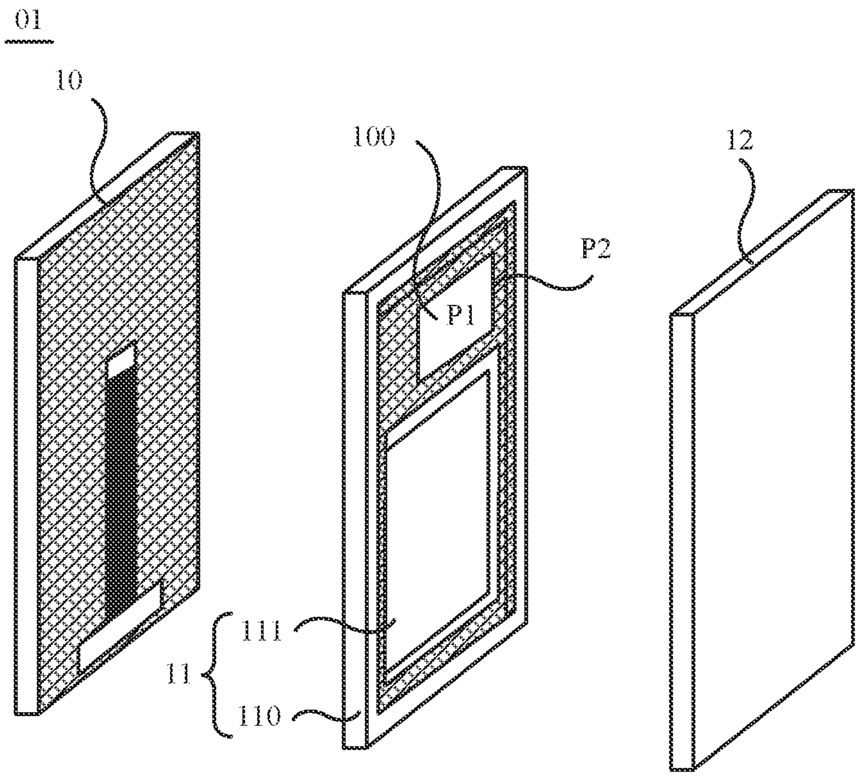
FIG. 1 is a schematic diagram of a structure of an electronic device according to an embodiment of this application.

01—Electronic device; 10—Display module; 11—Middle frame; 111—Metal rim; 110—Bearing plate; 100—PCB; 12—Back cover; 201—First radiator; 211—First stub; 221—Second stub; 202—Second radiator; 20—Antenna body; 31—First feed circuit; 32—Second feed circuit; 300—Antenna chassis; 42—Second configuration circuit; 311—Signal conversion circuit; 41—First configuration circuit; 410—First tuning component; and 420—Second tuning component.

DESCRIPTION OF EMBODIMENTS

The following describes the technical solutions in embodiments of this application with reference to the accompanying drawings in embodiments of this application. It is clear that the described embodiments are merely a part rather than all of embodiments of this application.

The following terms "first" and "second" are merely intended for a purpose of description and shall not be understood as an indication or implication of relative importance or an implicit indication of a quantity of indicated technical features. Therefore, a feature limited by "first" or "second" may explicitly or implicitly include one or more of the features. In the descriptions of this application, unless otherwise stated, "a plurality of" means two or more than two.

In addition, in embodiments of this application, orientation terms such as "upper", "lower", "left", and "right" may be defined by, but are not limited to, orientations of components schematically placed in the accompanying drawings. It should be understood that these orientation terms may be relative concepts, are used for description and clarification of "relative to", and may be changed correspondingly based on changes in placement orientations of the components in the accompanying drawings.

In this application, it should be noted that the term "connection" should be understood in a broad sense unless otherwise expressly specified and limited. For example, the "connection" may be a fixed connection, may be a detachable connection, may be an integral connection; may be a direct connection, or may be an indirect connection implemented by using a medium. In addition, the term "electrical connection" may be a direct electrical connection, or may be an indirect electrical connection implemented by using a medium.

An embodiment of this application provides an electronic device. The electronic device may be applied to various communications systems or communications protocols, such as a global system for mobile communications (global system for mobile communications, GSM), a code division multiple access (code division multiple access, CDMA) system, a wideband code division multiple access (wideband code division multiple access, WCDMA), a general packet radio service (general packet radio service, GPRS), and long term evolution (long term evolution, LTE). The electronic device may include an electronic product that has a wireless signal receiving and sending function, such as a mobile phone (mobile phone), a tablet computer (pad), a television, an intelligent wearable product (for example, a smartwatch or a smart band), an internet of things (internet of things, IOT), a virtual reality (virtual reality, VR) terminal device, an augmented reality (augmented reality AR) terminal device, and an unmanned aerial vehicle. A specific form of the electronic device is not particularly limited in this embodiment of this application.

As shown in FIG. 1, when the electronic device 01 has a display function, the electronic device 01 may include a display module 10. The display module 10 includes a liquid crystal display (liquid crystal display, LCD) module and a back light unit (back light unit, BLU). Alternatively, in some other embodiments of this application, the display module 10 may be an organic light-emitting diode (organic light-emitting diode, OLED) display.

In addition, the electronic device 01 may further include a middle frame 11 and a back cover 12. The middle frame 11 includes a bearing plate 110 and a metal rim 111 that wraps around the bearing plate 110. Electronic components such as a printed circuit board (printed circuit board, PCB) 100, a camera, and a battery may be disposed on a surface that is of the bearing plate 110 and that faces the back cover 12. The camera and the battery are not shown in the figure. The back cover 12 is connected to the middle frame 11 to form an accommodating cavity configured to accommodate the electronic components such as the PCB 100, the camera, and the battery. This can avoid impact on performance of the electronic device because of entering of water vapor and dust into the accommodating cavity.

Figure 2A:
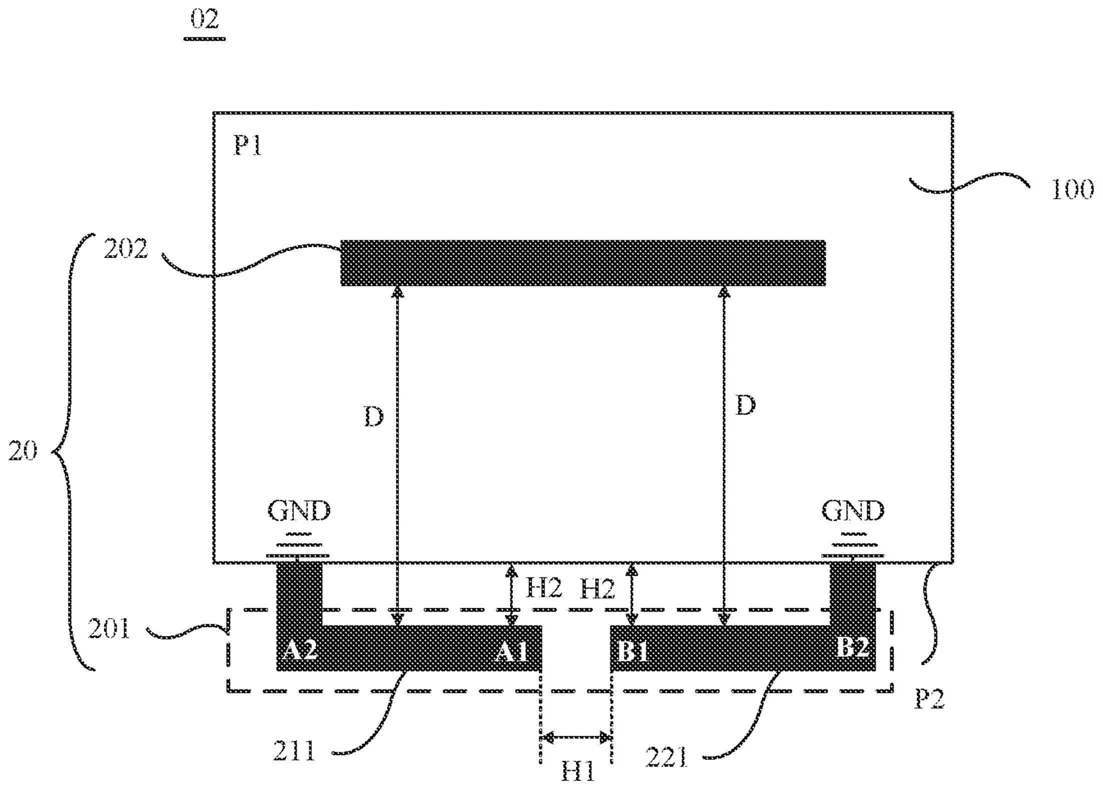
FIG. 2*a* is a schematic diagram of a structure of an antenna apparatus according to an embodiment of this application.

The electronic device 01 further includes an antenna apparatus 02 shown in FIG. 2*a* used for communication. The antenna apparatus 02 may include an antenna body 20 configured to transmit an electromagnetic wave and receive an electromagnetic wave. The antenna body 20 includes a first radiator 201 and a second radiator 202. The first radiator 201 includes a first stub 211 and a second stub 221. The first stub 211 has a first end A1 and a second end A2. The second stub 211 has a first end B1 and a second end B2. The first end A1 of the first stub 211 and the first end B1 of the second stub 221 are opposite to, but do not touch each other. A first gap H1 is configured between the first end A1 of the first stub 211 and the first end B1 of the second stub 221. The second end A2 of the first stub 211 and the second end B2 of the second stub 221 are electrically connected to reference ground GND of the PCB 100 separately.

The PCB 100 includes a first surface P1 and a first side edge P2. The first surface P1 of the PCB 100 faces the housing 12 in FIG. 1, and is parallel to a display surface of the display module 10. The first side edge P2 is disposed at an edge of the first surface P1. When the PCB 100 is rectangular, the PCB 100 may have four side edges that are sequentially connected head to tail. The first side edge P2 may be any one of the four side edges sequentially connected head to tail. The first stub 211 and the second stub 221 may be located on the first side edge P2 of the PCB 100. In addition, a second gap H2 is configured between the first stub 211 and the first side edge P2 of the PCB 100, and the second gap H2 is further configured between the second stub 221 and the first side edge P2 of the PCB 100.

Figure 2B:
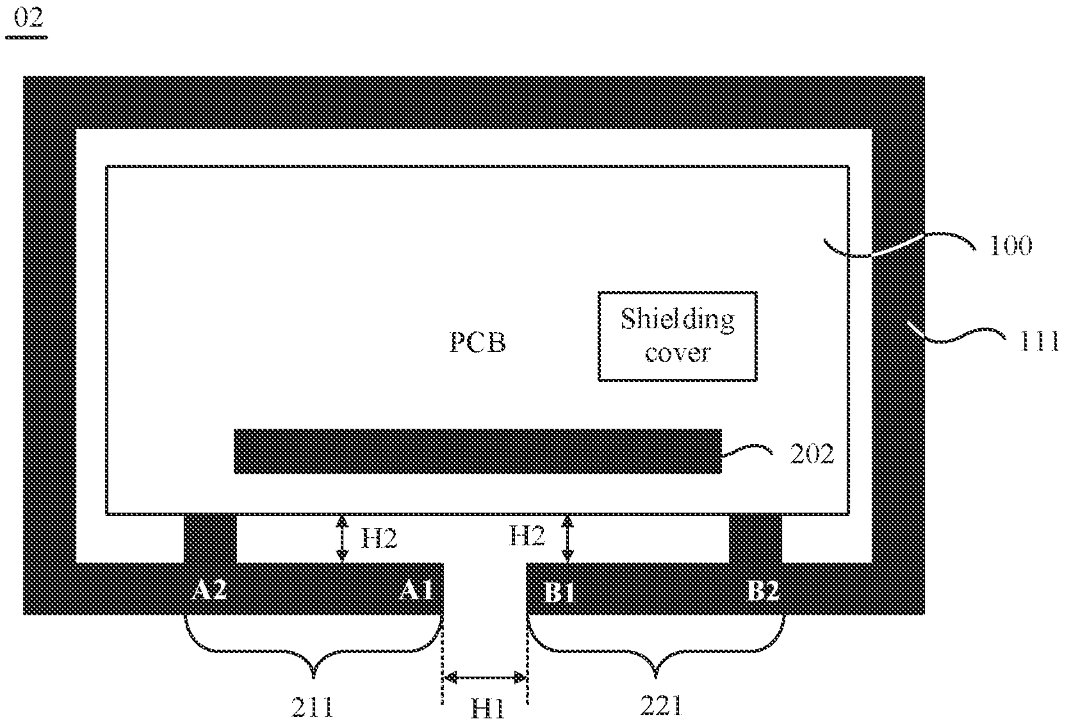
FIG. 2*b* is a schematic diagram of a structure of a first stub and a second stub in FIG. 2*a;*

In some embodiments of this application, as shown in FIG. 2*b*, the first radiator 201 may be a part of the metal rim 111 in FIG. 1. In a process of manufacturing the first radiator 201, the metal rim 111 may be manufactured by using a die-casting process or a computerized numerical control (computerized numerical control, CNC) machining process, and then a slit is made on the metal rim 111, to form the first gap H1. One end (for example, a left end) of the first gap H1 may be used as the first end A1 of the first stub 211, and the other end (for example, a right end) may be used as the first end B1 of the second stub 221.

In addition, a ground point disposed on one side (for example, a left side) of the first gap H1 may be used as the second end A2 of the first stub 211, and the second end A2 of the first stub 211 is electrically connected to the reference ground GND of the PCB 100 through a metal cable, a spring, or a metal sheet. When the metal sheet and the first stub 211 are of an integrated structure, the first stub 211 may be in an L shape shown in FIG. 2*a*. In addition, a ground point disposed on the other side (for example, a right side) of the first gap H1 may be used as the second end B2 of the second stub 221, and the second end B2 of the second stub 221 is electrically connected to the reference ground GND of the PCB 100 through a metal cable, a spring, or a metal sheet. When the metal sheet and the second stub 221 are of an integrated structure, the second stub 221 may be in an L shape shown in FIG. 2*a*. A control chip is usually disposed on the PCB 100. To protect the control chip and reduce signal interference, a shielding cover shown in FIG. 2*b* is used to cover the control chip.

Figure 2C:
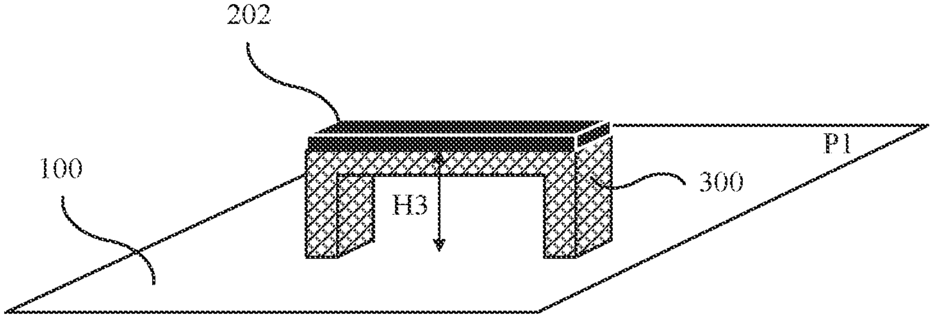
FIG. 2*c* is a schematic diagram of a structure of a second radiator in FIG. 2*a;*

In addition, as shown in FIG. 2*c*, the second radiator 202 is located on the PCB 100, a third gap H3 is configured between the second radiator 202 and the first surface P1 of the PCB 100, and a vertical projection of the second radiator 202 is located on the first surface P1 of the PCB 100. To form the third gap H3 between the second radiator 202 and the PCB 100, the antenna apparatus 02 may further include an antenna chassis 300. The antenna chassis 300 may be disposed on the first surface P1 of the PCB 100. A height L (with a height direction perpendicular to the PCB 100) of the antenna chassis is the same as the third gap H3. The second radiator 202 is disposed on a surface of a side that is of the antenna chassis and that is away from the first surface P1 of the PCB 100. A material of the antenna chassis 300 may include an insulation material, for example, plastic.

In this case, in some embodiments of this application, in a process of manufacturing the second radiator 202, a laser direct structuring (laser direct structuring, LDS) process may be performed on a surface of a side disposed on the PCB 100 that is of the antenna chassis 300 and that is away from the PCB 100, to metallize the surface of the side that is of the antenna chassis 300 and that is away from the PCB 100, to form the second radiator 202. Alternatively, in some other embodiments of this application, a manufactured metal sheet used as the second radiator 202 is attached to a surface of a side that is of the antenna chassis 300 and that is away from the PCB 100. A manner of manufacturing the second radiator 202 is not limited in this application.

In some embodiments of this application, to avoid impact on performance of the second radiator 202, the third gap H3 between the second radiator 202 and the PCB 100 may meet a requirement that H3≥0.5 mm.

Figure 2D:
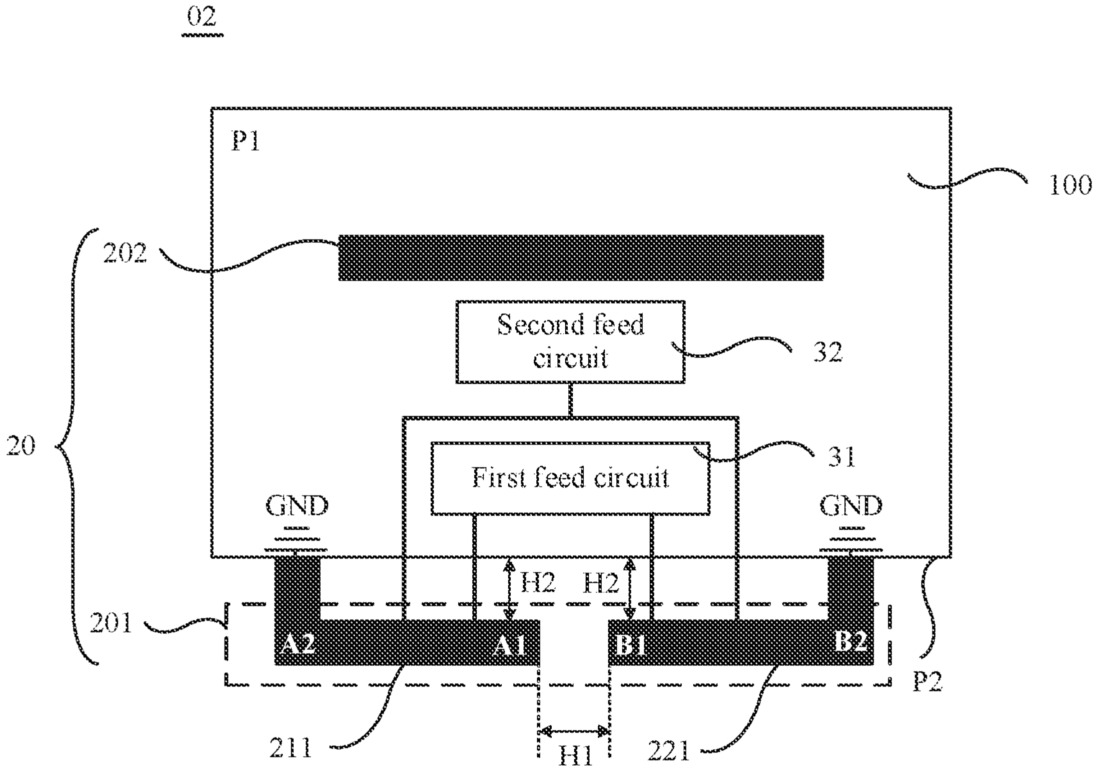
FIG. 2*d* is another schematic diagram of a structure of an antenna apparatus according to an embodiment of this application.

In addition, as shown in FIG. 2*d*, the antenna apparatus 02 may further include a first teed circuit 31 and a second feed circuit 32. The first feed circuit 31 is electrically connected to the first stub 211 and the second stub 221. The first feed circuit 31 is configured to transmit equal-amplitude out-of-phase excitation signals to the first stub 211 and the second stub 221 respectively. That is, a signal transmitted by the first feed circuit 31 to the first stub 211 and a signal transmitted by the first feed circuit 31 to the second stub 221 are equal-amplitude out-of-phase. In this application, a manner in which the first feed circuit 31 feeds the first stub 211 and the second stub 221 may be referred to as asymmetrical (asymmetrical) feeding.

Figure 3:
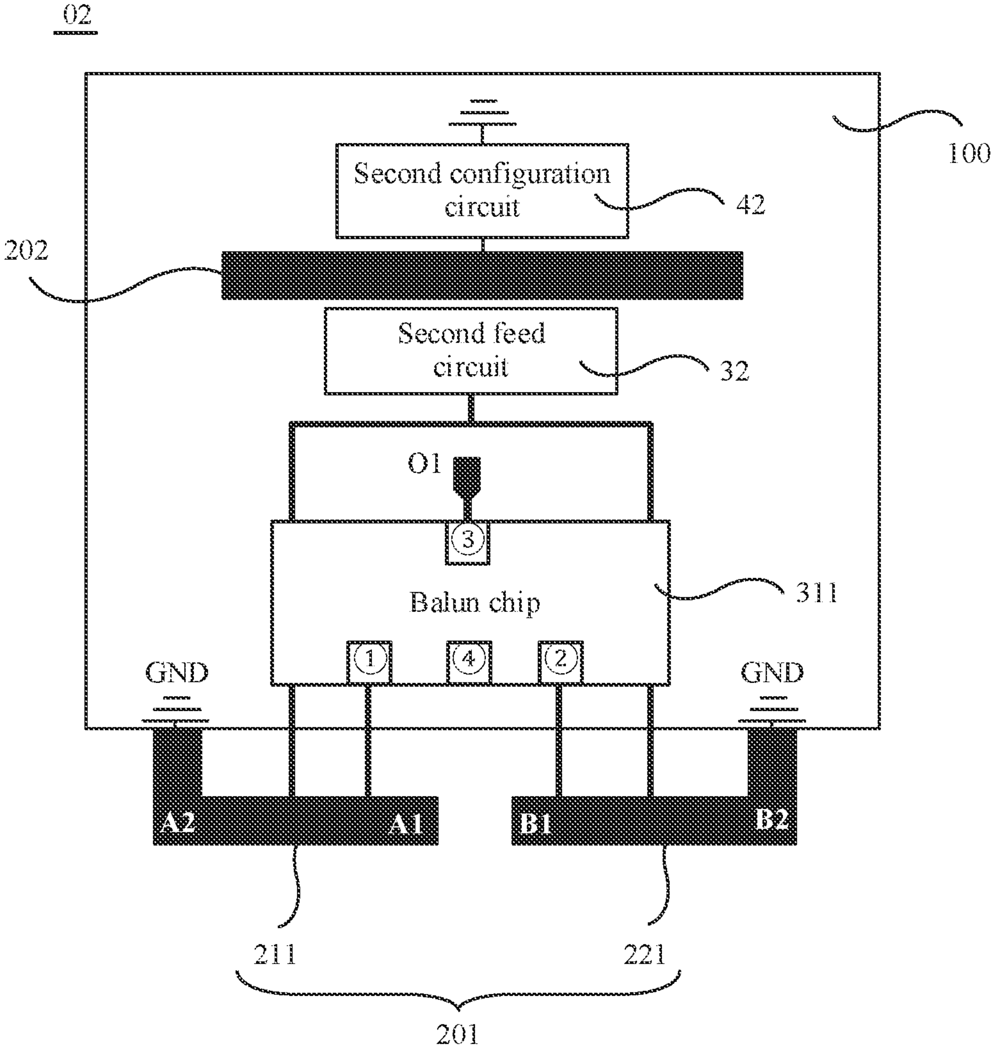
FIG. 3 is another schematic diagram of a structure of an antenna apparatus according to an embodiment of this application.

To enable the first feed circuit 31 to transmit the equal-amplitude out-of-phase excitation signals to the first stub 211 and the second stub 221 respectively, in some embodiments of this application, the first feed circuit 31 may include a signal conversion circuit 311 shown in FIG. 3. The signal conversion circuit 311 has a first output end ①, a second output end ②, and an input end ③. Based on this, a first excitation end O1 may be disposed on the PCB 100, and the input end ③ may be electrically connected to the first excitation end O1. The first output end ① may be electrically connected to the first stub 211, and the second output end ② may be electrically connected to the second stub 221.

In this case, the signal conversion circuit 311 may be configured to convert a signal output by the first excitation end O1 into a first excitation signal and a second excitation signal that are equal-amplitude out-of-phase. Next, the signal conversion circuit 311 may transmit the first excitation signal to the first stub 211 through the first output end ①, and transmit the second excitation signal to the second stub 221 through the second output end ②.

Figure 4A:
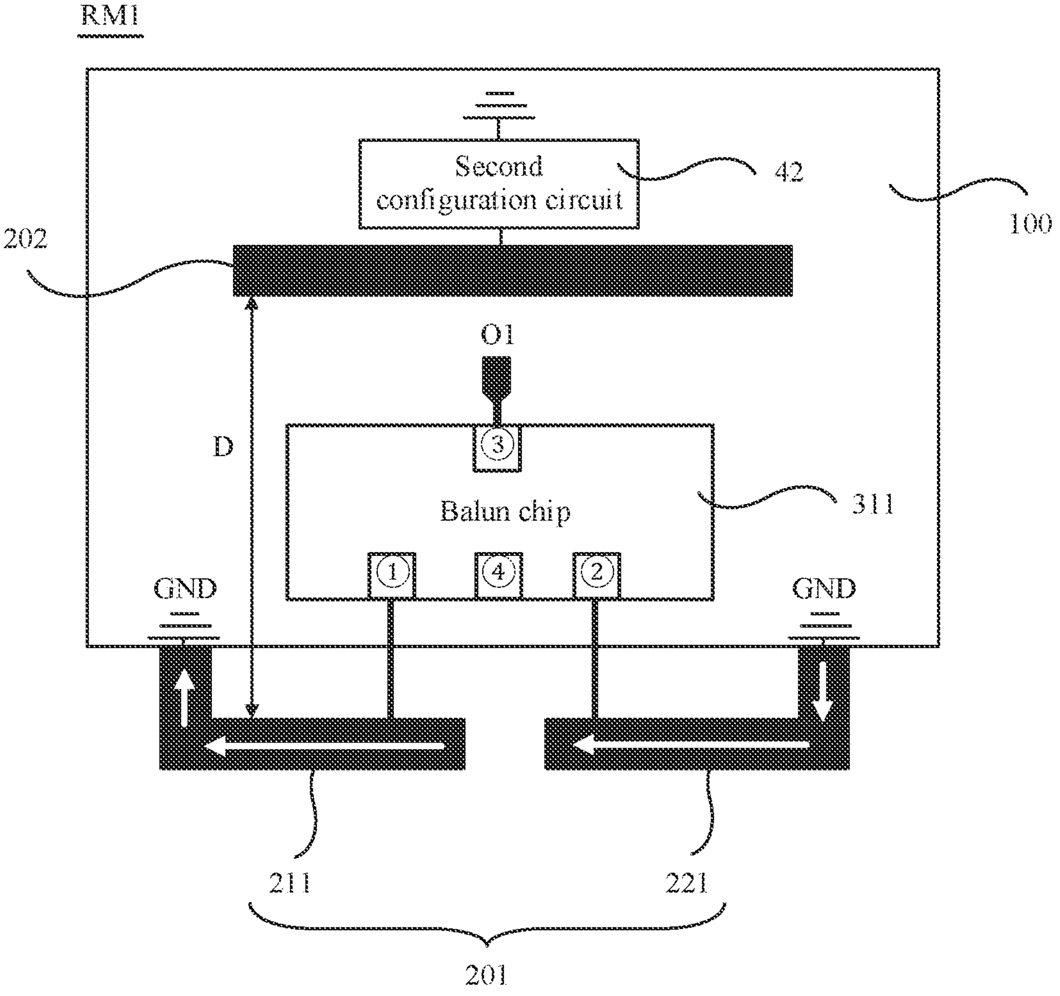
FIG. 4*a* is a schematic diagram of a first feeding mode generated when an antenna body is excited by a first feed circuit according to an embodiment of this application.

In this way, the first excitation signal and the second excitation signal that are output by the signal conversion circuit 311 may excite the antenna body 20 to generate a first radiation mode (radiation mode, RM). In the first radiation mode RM1, as shown in FIG. 4*a*, currents (shown by arrows in FIG. 4*a*) are mainly distributed on the first radiator 201, so that the first radiator 201 is used as a main radiation element. In addition, in the first radiator 201, a flow direction of a current distributed on the first stub 211 is the same as a flow direction of a current distributed on the second stub 221.

In addition, there is a distance D between the first radiator 201 and the second radiator 202 (as shown in FIG. 2*a* or FIG. 4*a*). The distance D meets D≤7 mm. In this way, because the distance between the first radiator 201 and the second radiator 202 is short, the first radiator 201 is indirectly coupled to the second radiator 202. Therefore, when the first radiator 201 generates a current under excitation by the first excitation signal and the second excitation signal, the current may be coupled to the second radiator 202, to excite the antenna body 20 to generate a second radiation mode RM2.

It should be noted that, in embodiments of this application, direct coupling between two components means that the two components are in direct contact, or a component configured to electrically connect the two components is disposed between the two components. Therefore, that the first radiator 201 is indirectly coupled to the second radiator 202 means that the first radiator 201 is not in contact with the second radiator 202, and no component that is configured to electrically connect the first radiator 201 and the second radiator 202 is disposed between the first radiator 201 and the second radiator 202.

In addition, the accompanying drawings in this application are described by using an example in which the first stub 211 and the second stub 221 in the first radiator 201 and the second radiator 202 are all in shapes of long-striped rectangles, and the second radiator 202 is parallel to the first stub 211 and the second stub 221. In this case, the distance D between the first radiator 201 and the second radiator 202 refers to a distance between an edge that is of the first stub 211 (or the second stub 221) in the first radiator 201 and that is close to the second radiator 202 and an edge that is of the second radiator 202 and that is close to the first radiator 201.

In some other embodiments of this application, edge shapes of the first stub 211, the second stub 221, and the second radiator 202 may be irregular, and the second radiator 202 is not disposed in parallel to the first stub 211 and the second stub 221. In this case, the distance D between the first radiator 201 and the second radiator 202 refers to a shortest distance between any point on an edge that is of the first stub 211 (or the second stub 221) in the first radiator 201 and that is close to the second radiator 202 and any point on an edge that is of the second radiator 202 and that is close to the first radiator 201.

Figure 4B:
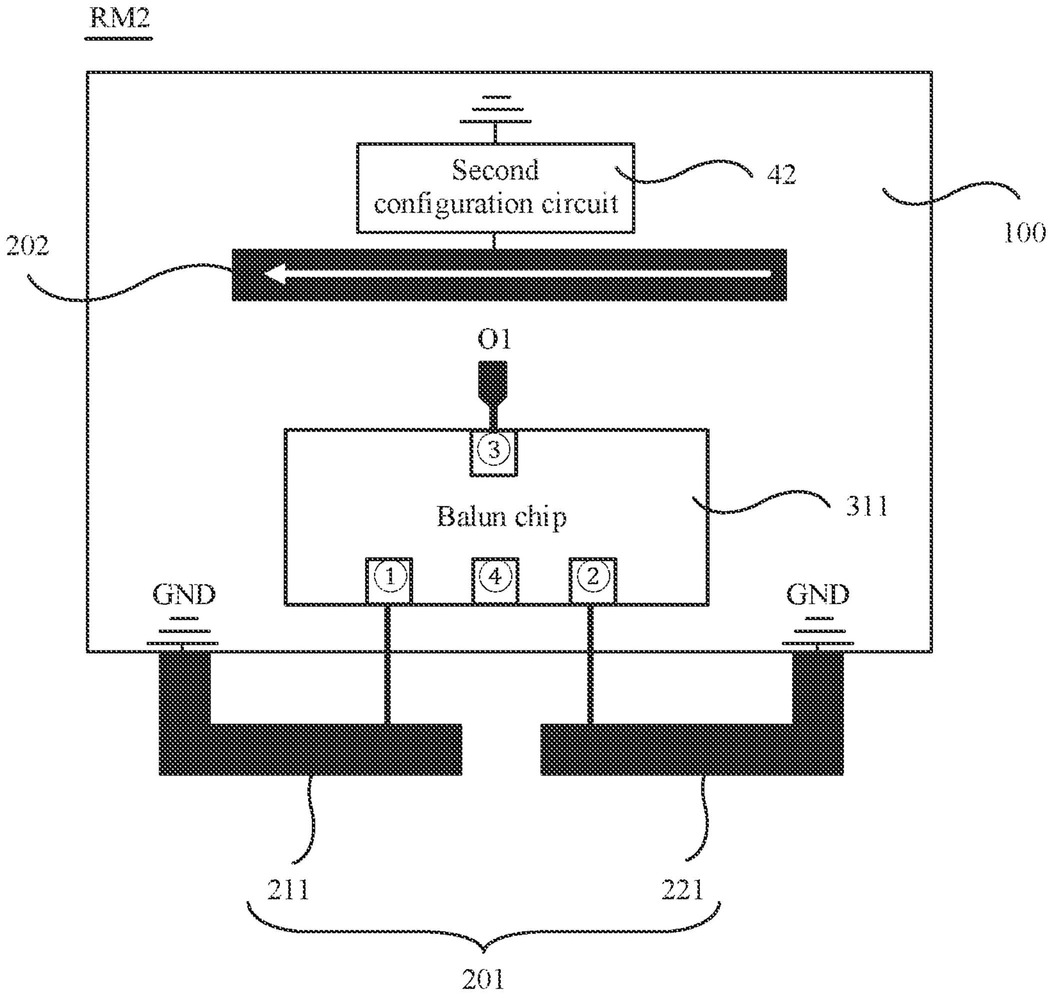
FIG. 4*b* is a schematic diagram of a second feeding mode generated when an antenna body is excited by a first feed circuit according to an embodiment of this application.

In the second radiation mode RM2, as shown in FIG. 4*b*, currents (shown by arrows in FIG. 4*b*) are mainly distributed on the second radiator 202, so that the second radiator 202 is used as a main radiation element (referred to as a main radiation element below for short). In addition, the currents distributed on the second radiator 202 have a same flow direction. In this case, under excitation of the first excitation end O1, the antenna body 20 may be used as a first antenna, and has the first radiation mode RM1 and the second radiation mode RM2. For example, the signal conversion circuit 311 may include a balun chip. In this case, the input end ③ of the signal conversion circuit 311 may be referred to as an unbalanced (unbalanced) port of the balun chip, and the first output end ① and the second output end ② of the signal conversion circuit 311 may be referred to as balanced (balanced) ports. In addition, the balun chip further includes a reference ground end ④ configured to ground. In this way, the balun chip may convert an unbalanced signal at the input end ③, and output balanced signals that are equal-amplitude out-of-phase through the first output end ① and the second output end ② respectively.

The balun chip has a small packaging size, in the antenna structure 02, so that a single-end signal provided by the first excitation end O1 can be converted into two equal-amplitude out-of-phase signals by using the balun chip with a small packaging size, and a size of the antenna structure 02 can be reduced. In addition, an amplitude difference between the first excitation signal and the second excitation signal that are output at the first output end ① and the second output end ② of the balun chip respectively may be within a range of 1 dB to 2 dB, and a phase difference between the first excitation signal and the second excitation signal is approximately 180±15°. Therefore, the first output end ① and the second output end ② have a high balance degree, so that the first excitation signal and the second excitation signal can meet an equal-amplitude out-of-phase requirement, to effectively excite the antenna body 20 to generate the first radiation mode and the second radiation mode.

Figure 5A:
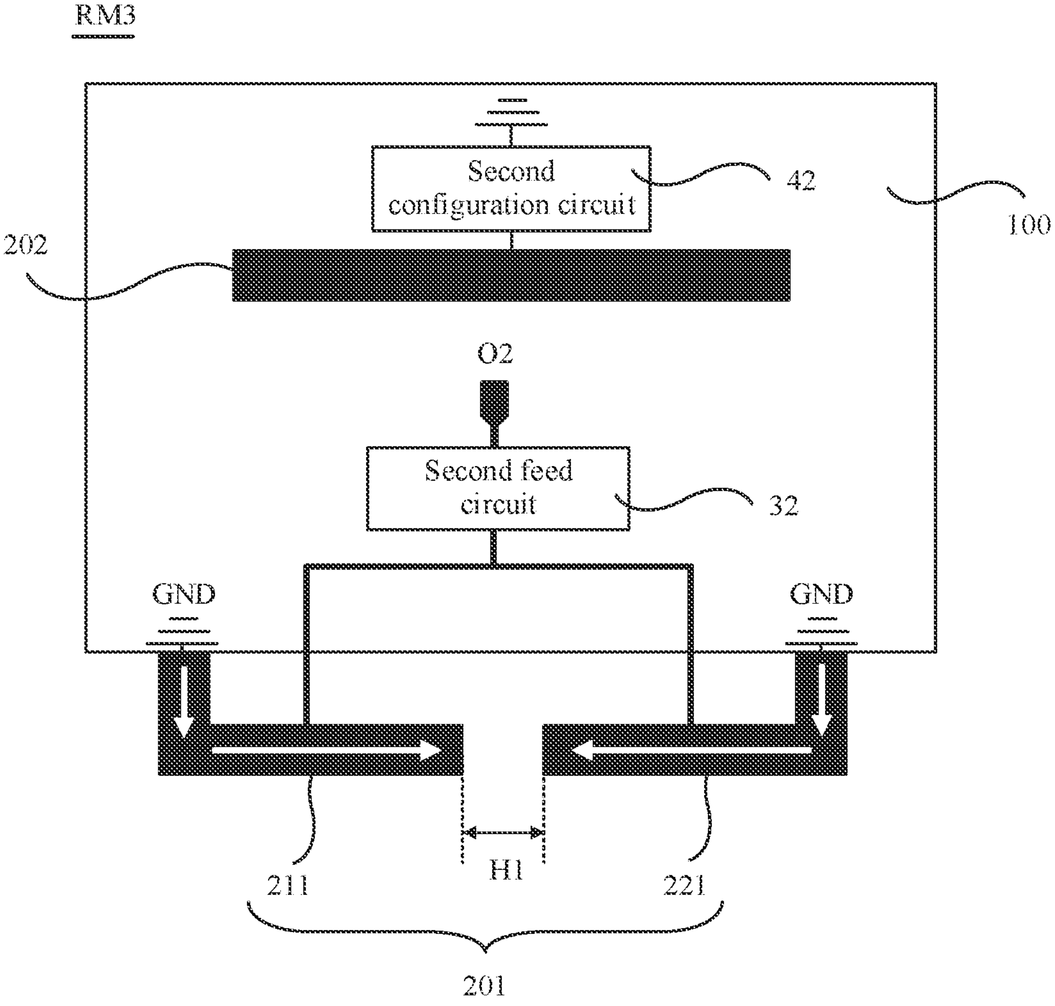
FIG. 5*a* is a schematic diagram of a third feeding mode generated when an antenna body is excited by a second feed circuit according to an embodiment of this application.

In addition, as shown in FIG. 5*a*, the second feed circuit 32 may be electrically connected to the first stub 211 and the second stub 221 in the first radiator 201. The second feed circuit 32 may further be electrically connected to a second excitation end O2 disposed on the PCB 100. The second feed circuit 32 may simultaneously transmit, to the first stub 211 and the second stub 221, a signal output by the second excitation end O2, and excite the antenna body 20 to generate a third radiation mode RM3. Therefore, the second feed circuit 32 transmits a same excitation signal to the first stub 211 and the second stub 221. In this application, a manner in which the second feed circuit 32 feeds the first stub 211 and the second stub 221 may be referred to as symmetrical (symmetrical) feeding.

In the third radiation mode RM3, as shown in FIG. 5*a*, currents (shown by arrows in FIG. 5*a*) are mainly distributed on the first radiator 201, so that the first radiator 201 is used as a main radiation element. In addition, in the first radiator 201, a flow direction of a current distributed on the first stub 211 is opposite to that of a current distributed on the second stub 221 relative to the first gap H1.

It should be noted that signals output by the first excitation end O1 and the second excitation end O2 are not limited in this application, and may be the same or may be different. The first excitation end O1 and the second excitation end O2 may be disposed on a same surface of the PCB 100, for example, the first surface P1, or may be disposed on two opposite surfaces of the PCB 100 respectively, for example, disposed on the first surface P1 of the PCB 100 and a surface opposite to the first surface P1 respectively.

Figure 5B:
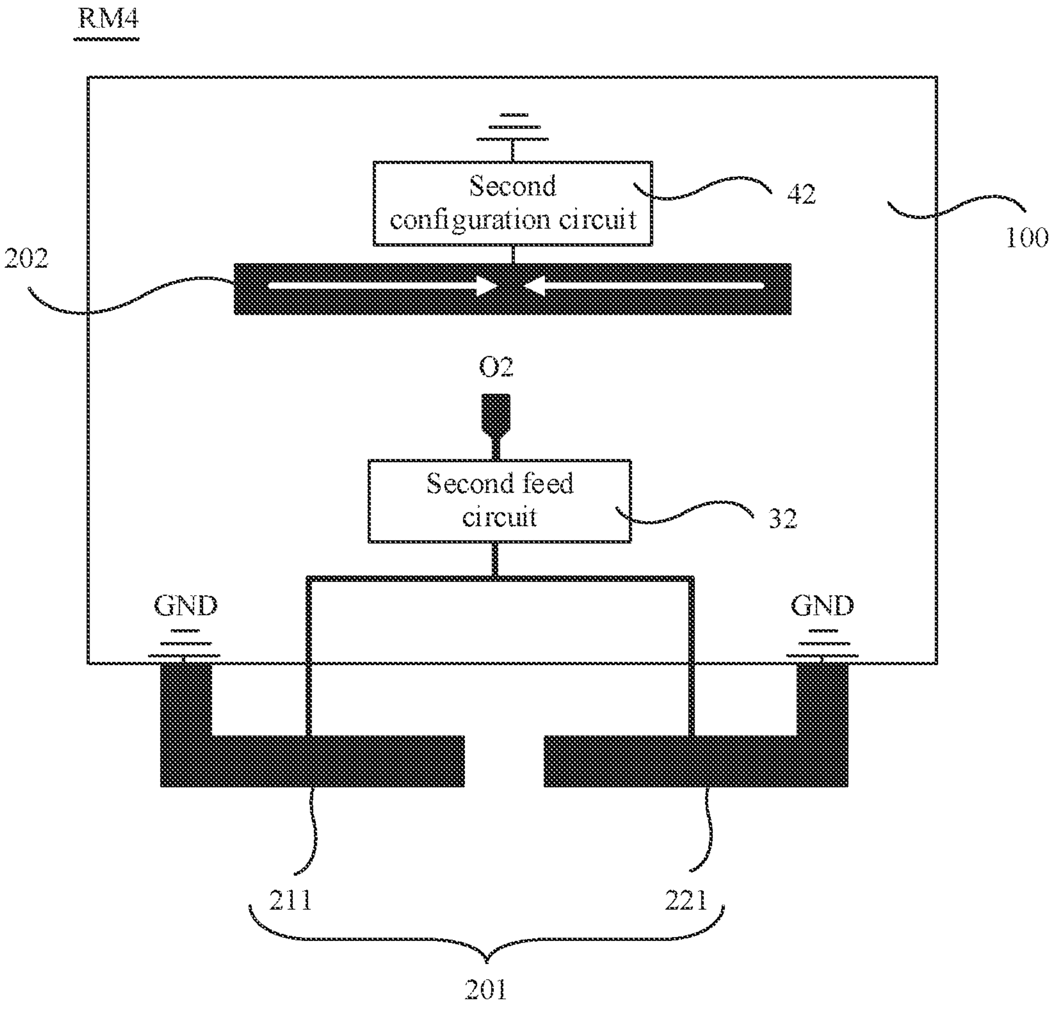
FIG. 5*b* is a schematic diagram of a fourth feeding mode generated when an antenna body is excited by a second feed circuit according to an embodiment of this application.

In addition, in some embodiments of this application, the antenna apparatus 01 further includes a second configuration circuit 42 shown in FIG. 5*b*. The second configuration circuit 42 may be disposed between the second radiator 202 and the reference ground GND of the PCB 100, and is electrically connected to a center of the second radiator 202 and the reference ground GND of the PCB 100. Based on this, because a distance between the first radiator 201 and the second radiator 202 is short, for example, a distance D between the first radiator 201 and the second radiator 202 meets D≤7 mm, when the first radiator 201 generates a current under excitation of the second feed circuit 32, the current may be coupled to the second radiator 202, to implement coupling between the first radiator 201 and the second radiator 202, and excite the antenna body to generate a fourth radiation mode RM4. The second configuration circuit 42 is configured to tune a resonance frequency and bandwidth of the second radiator 202 in the fourth radiation mode RM4. In this way, the second configuration circuit 42 may be configured based on a requirement, so that the resonance frequency and bandwidth of the second radiator 202 in the fourth radiation mode RM4 meet a requirement.

It should be noted that, that the second configuration circuit 42 is electrically connected to a center of the second radiator 202 means that, on a premise that when the antenna body 20 is in the second radiation mode RM2 and the fourth radiation mode RM4, a current on the first radiator 201 may be coupled to the second radiator 202, so that the second radiator 202 is used as a main radiator, the center of the second radiator 202 may be a center of a geometric shape of the second radiator 202, or the center of the second radiator 202 may be shifted by 10% left or right from the center of the geometric shape of the second radiator 202 in a length direction of the strip-shaped second radiator 202.

In the fourth radiation mode RM4, as shown in FIG. 5*b*, currents (shown by arrows in FIG. 5*b*) are mainly distributed on the second radiator 202, so that the second radiator 202 is used as a main radiation element. In addition, flow directions of the currents distributed on the second radiator 202 are opposite to each other relative to the center of the second radiator 202, that is, the flow directions of the currents distributed on the second radiator 202 are separately from two ends of the second radiator 202 to the center of the second radiator 202. In this case, under excitation of the second excitation end O2, the antenna body 20 may be used as a second antenna, and has the foregoing third radiation mode RM3 and the fourth radiation mode RM4. In this way, the antenna body 20 may be used as the first antenna under excitation of the first excitation end O1, or may be used as the second antenna under excitation of the second excitation end O2, to form dual antennas.

The foregoing description is provided by using an example in which the second radiator 202 is electrically connected to the reference ground GND of the PCB 100 through the second configuration circuit 42. In this case, the second feed circuit 32 may excite the antenna body 20 to generate the third radiation mode RM3 and the fourth radiation mode RM4. In some other embodiments of this application, the second radiator 202 may be a passive resonance structure, and the second radiator 202 is neither electrically connected to the reference ground nor to the excitation end. In this case, the second feed circuit 32 may excite the antenna body 20 to generate only the third radiation mode RM3. For ease of description, an example is used below in which the second configuration circuit 42 is disposed between the second radiator 202 and the reference ground GND of the PCB 100, and the second feed circuit 32 excites the antenna body 20 to generate the third radiation mode RM3 and the fourth radiation mode RM4.

In conclusion, in the antenna structure 02 provided in this embodiment of this application, the first feed circuit 31 can excite the antenna body 20 as the first antenna to generate the first radiation mode RM1 shown in FIG. 4*a* and the second radiation mode RM2 shown in FIG. 4*b*. In addition, the second feed circuit 32 may excite the antenna body 20 as the second antenna to generate the third radiation mode RM3 shown in FIG. 5*a* and the fourth radiation mode RM4 shown in FIG. 5*b*. In this way, in one aspect, the first feed circuit 31 and the second feed circuit 32 may separately excite the antenna mode 20 to generate two radiation modes. In this case, the antenna structure 02 in this application may excite the foregoing four modes. In addition, a frequency range covered by the first radiation mode RM1, a frequency range covered by the second radiation mode RM2, a frequency range covered by the third radiation mode RM3, and a frequency range covered by the fourth radiation mode RM4 of the antenna body 20 may be at least partially different from each other. In this way, either of the first excitation end O1 (electrically connected to the first feed circuit 31) and the second excitation end O2 (electrically connected to the second feed circuit 32) can excite the antenna body 20 to generate two radiation modes. Therefore, the antenna body 20 can transmit more data. Compared with a solution in which one excitation end can excite only one antenna mode, the solution provided in this embodiment of this application can enable the antenna body 02 to obtain a wider bandwidth.

In some embodiments of this application, the antenna body 20 may be used as a transmit antenna (or a receive antenna) when operating in the first radiation mode RM1 and the second radiation mode RM2 that are generated through excitation of the first feed circuit 31, and the antenna body 20 may be used as a receive antenna (or a transmit antenna) when operating in the third radiation mode RM3 and the fourth radiation mode RM4 that are generated through excitation of the second feed circuit 32. Alternatively, in some other embodiments of this application, when operating in the foregoing four excitation modes (the first radiation mode RM1, the second radiation mode RM2, the third radiation mode RM3, and the fourth radiation mode RM4), the antenna body 20 may be used as only a transmit antenna or as only a receive antenna.

In addition, when the first radiator 201 is used as a main radiator, the antenna body 20 needs to satisfy specific symmetry, to balance two current signals respectively received on the first stub 211 and the second stub 221, so as to improve isolation between different excitation ends, for example, the first excitation end O1 and the second excitation end O2 (or the first antenna and the second antenna). For example, the first stub 211 and the second stub 221 in the first radiator 201 may be disposed symmetrically with respect to a center of the first gap H1 (as shown in FIG. 5*a*). In this case, when the antenna body 20 is in the third radiation mode RM3, in the first radiator 201 that is used as a main radiator, a current distributed on the first stub 211 and a current distributed on the second stub 221 have flow directions opposite to each other relative to the first gap H1, and are symmetrically distributed with respect to the center of the first gap H1.

In addition, when the second radiator 202 is strip-shaped as shown in FIG. 5*b*, a center of the second radiator 202 and the center of the first gap H1 may be in a same straight line, so that the antenna body 20 can meet specific symmetry. In this case, when the antenna body 20 is in the fourth radiation mode RM4, in the second radiator 202 that is used as a main radiator, currents distributed on the second radiator 202 have flow directions opposite to each other relative to the center of the second radiator 202, and are symmetrically distributed with respect to the center of the second radiator 202.

It should be noted that, that the first stub 211 and the second stub 221 are disposed symmetrically with respect to the center of the first gap H1 means that, on the premise that a requirement on isolation between the first excitation end O1 and the second excitation end O2 (or the first antenna and the second antenna) is met, the first stub 211 and the second stub 221 may be approximately disposed symmetrically with respect to the center of the first gap H1, and the first stub 211 and the second stub 221 are not limited to be strictly disposed symmetrically with respect to the center of the first gap H1. In addition, that the center of the second radiator 202 and the center of the first gap H1 may be in a same straight line means that on a premise that a requirement on isolation between the first excitation end O1 and the second excitation end O2 (or the first antenna and the second antenna) is met, the center of the second radiator 202 and the center of the first gap H1 may be approximately in a same straight line, and the center of the second radiator 202 and the center of the first gap H1 are not limited to be strictly disposed in a same straight line.

Based on this, it can be learned from the foregoing description that, when the first feed circuit 31 excites the antenna body 20 to generate the first radiation mode RM1, and when the second feed circuit 32 excites the antenna body 20 to generate the third radiation mode RM3, the first radiator 201 is used as the main radiation element. However, in the first radiation mode RM1, as shown in FIG. 4*a*, in the first radiator 201, the flow direction of the current distributed on the first stub 211 is the same as the flow direction of the current distributed on the second stub 221. In the third radiation mode RM3, as shown in FIG. 5*a*, in the first radiator 201, the flow direction of the current distributed on the first stub 211 is opposite to the flow direction of the current distributed on the second stub 221 relative to the first gap H1.

Therefore, when the antenna body 20 meets the foregoing symmetry, currents on the antenna body 20 (for example, the first radiator 201) in the first radiation mode RM1 generated through excitation of the first excitation end O1 may be orthogonal to currents on the antenna body 20 in the third radiation mode RM3 and the fourth radiation mode RM4 generated through excitation of the second excitation end O2 (the currents are distributed on the first radiator 201 in the third radiation mode RM3, and the currents are distributed on the second radiator 202 in the fourth radiation mode RM4). In this case, radio waves on the antenna body 20 (for example, the first radiator 201) in the first radiation mode RM1 may be orthogonal to radio waves on the antenna body 20 in the third radiation mode RM3 and the fourth radiation mode RM4 (in the third radiation mode RM3, the first radiator 201 mainly generates the radio waves, and in the fourth radiation mode RM4, the second radiator 202 mainly generates the radio waves). Therefore, under excitation of different excitation ends (for example, the first excitation end O1 and the second excitation end O2), isolation between the first antenna and the second antenna separately formed by a same radiator in the antenna body 20, for example, the first radiator 201, is high.

Similarly, when the first feed circuit 31 electrically connected to the first excitation end O1 excites the antenna body 20 to generate the second radiation mode RM2, and when the second feed circuit 32 electrically connected to the second excitation end O2 excites the antenna body 20 to generate the fourth radiation mode RM4, the second radiator 202 is used as the main radiating element. However, in the second radiation mode RM2, as shown in FIG. 4*b*, the currents distributed on the second radiator 202 have a same flow direction. In the fourth radiation mode RM4, as shown in FIG. 5*b*, the currents distributed on the second radiator 202 have flow directions opposite to each other relative to the center of the second radiator 202.

Therefore, when the antenna body 20 meets the foregoing symmetry, currents on the antenna body 20 (for example, the second radiator 202) in the second radiation mode RM2 generated through excitation of the first excitation end O1 may be orthogonal to currents on the antenna body 20 in the third radiation mode RM3 and the fourth radiation mode RM4 generated through excitation of the second excitation end O2 (for example, the currents are distributed on the first radiator 201 in the third radiation mode RM3, and the currents are distributed on the second radiator 202 in the fourth radiation mode RM4). In this case, radio waves on the antenna body 20 (for example, the second radiator 202) in the second radiation mode RM2 may be orthogonal to radio waves on the antenna body 20 in the third radiation mode RM3 and the fourth radiation mode RM4 (for example, in the third radiation mode RM3, the first radiator 201 mainly generates the radio waves, and in the fourth radiation mode RM4, the second radiator 202 mainly generates the radio waves). Therefore, under excitation of different excitation ends (for example, the first excitation end O1 and the second excitation end O2), isolation between a first antenna and a second antenna separately formed by a same radiator in the antenna body 20, for example, the second radiator 202, is high.

In conclusion, under excitation of the first excitation end O1 and the second excitation end O2, the first radiation mode RM1 is orthogonal to the third radiation mode RM3 and the fourth radiation mode RM4, and the second radiation mode RM2 is orthogonal to the third radiation mode RM3 and the fourth radiation mode RM4. Therefore, isolation between the first antenna and the second antenna separately formed by the antenna body 20 under the different excitation ends is high, so that dual antennas with high isolation can be implemented based on an increased bandwidth of the antenna body 20.

In another aspect, it can be learned from the foregoing that, the first radiator 201 may be a part of the metal rim 111, and the first gap H1 is formed by making a slit on the metal rim 111, so that the first stub 211 and the second stub 221 in the first radiator 201 can be manufactured. In a process of manufacturing the first radiator 201, only one slit, that is, the foregoing first gap H1, needs to be formed on the metal rim 111. Therefore, there are fewer demands on slit making on the metal rim 111, which helps improve an appearance effect of the electronic product.

In some embodiments of this application, radiation frequencies of the antenna body 20 in the foregoing four excitation modes may cover a low frequency hand (for example, approximately 700 MHz to 960 MHz), a medium-high frequency band (for example, 1700 MHz to 2700 MHz), an N77 frequency band (3300 MHz to 4200 MHz), or an N79 frequency band (4400 MHz to 5000 MHz). In addition, frequency bands in which the antenna body 20 works in different excitation modes may overlap. For example, the antenna body 20 in the first radiation mode RM1 and the third radiation mode RM3 (or in the second radiation mode RM2 and the fourth radiation mode RM4) may be applied to intra-frequency Wi-Fi dual antennas and intra-frequency Bluetooth dual antennas. Alternatively, frequency bands in which the antenna body 20 works in the different excitation modes may not overlap. For example, the antenna body 20 in the first radiation mode RM1 and the third radiation mode RM3 (or in the second radiation mode RM2 and the fourth radiation mode RM4) may be applied to a Wi-Fi (2.4 GHz) and medium-high frequency dual antennas.

Based on this, to further tune the radiation frequencies and bandwidths of the antenna body 20, the following describes in detail a structure of the antenna body 20 and a manner of disposing internal elements.

In some embodiments of this application, radiation frequencies of the antenna body 20 may cover a medium-high frequency band (for example, 1700 MHz to 2700 MHz). In this case, the antenna body 20 may include a first configuration circuit 41 shown in FIG. 6*a*. In some embodiments of this application, the first configuration circuit 41 may include a first capacitor C1 and a second capacitor C2 shown in FIG. 6*b*.

A first end of the first capacitor C1 is electrically connected to the first output end ① of the signal conversion circuit 311, and a second end of the first capacitor C1 is electrically connected to the first stub 211. A first end of the second capacitor C2 is electrically connected to the second output end ② of the signal conversion circuit 311, and a second end of the second capacitor C2 is electrically connected to the second stub 221.

The first capacitor C1 and the second capacitor C2 are used for feeding matching. For example, when capacitance values of the first capacitor C1 and the second capacitor C2 are larger, a resonance frequency of the antenna body 20 is lower when the first feed circuit 31 excites the antenna body 20 to generate the first radiation mode RM1; or when capacitance values of the first capacitor C1 and the second capacitor C2 are smaller, a resonance frequency of the antenna body 20 is higher when the first feed circuit 31 excites the antenna body 20 to generate the first radiation mode RM1.

In some other embodiments of this application, the first configuration circuit 41 may further include a fourth inductor L4. A first end of the fourth inductor L4 is electrically connected to the first end of the first capacitor C1, and a second end of the fourth inductor L4 is electrically connected to the first end of the second capacitor C2.

In this case, the fourth inductor L4 may tune a depth of an input return loss (S11) curve of the antenna body 20 (that is, an input return loss of the antenna body 20) and a width of the resonance frequency when the first feed circuit 31 excites the antenna body 20 to generate the first radiation mode RM1. When an inductance value of the fourth inductor L4 is smaller, the depth of the input return loss (S11) curve of the antenna body 20 is greater (that is, the input return loss of the antenna body 20 is smaller), and the width of the resonance frequency is smaller; or when an inductance value of the fourth inductor L4 is larger, the depth of the S parameter curve is smaller, and the width of the resonance frequency is greater.

Figure 6A:
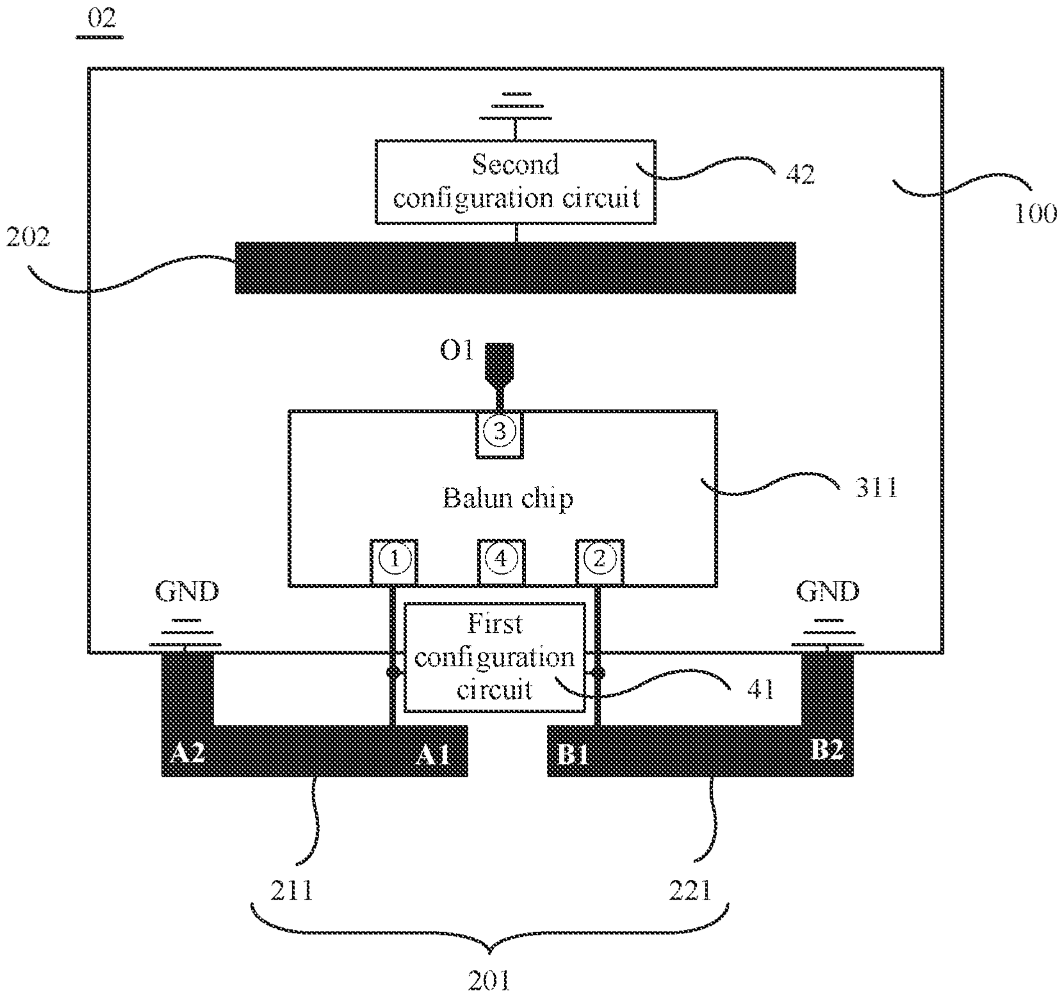
FIG. 6*a* is another schematic diagram of a structure of an antenna apparatus according to an embodiment of this application.
Figure 6B:
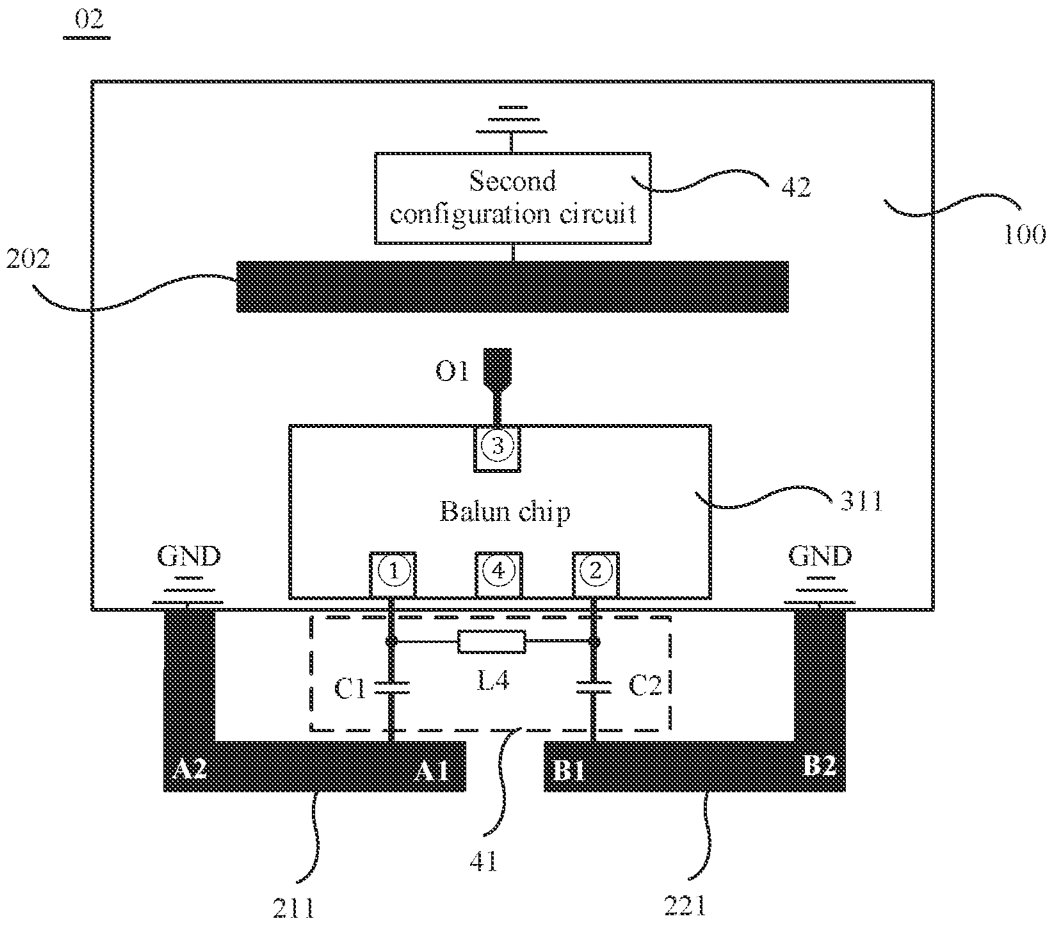
FIG. 6*b* is a schematic diagram of a disposing manner of a first configuration circuit in FIG. 6*a;*
Figure 6C:
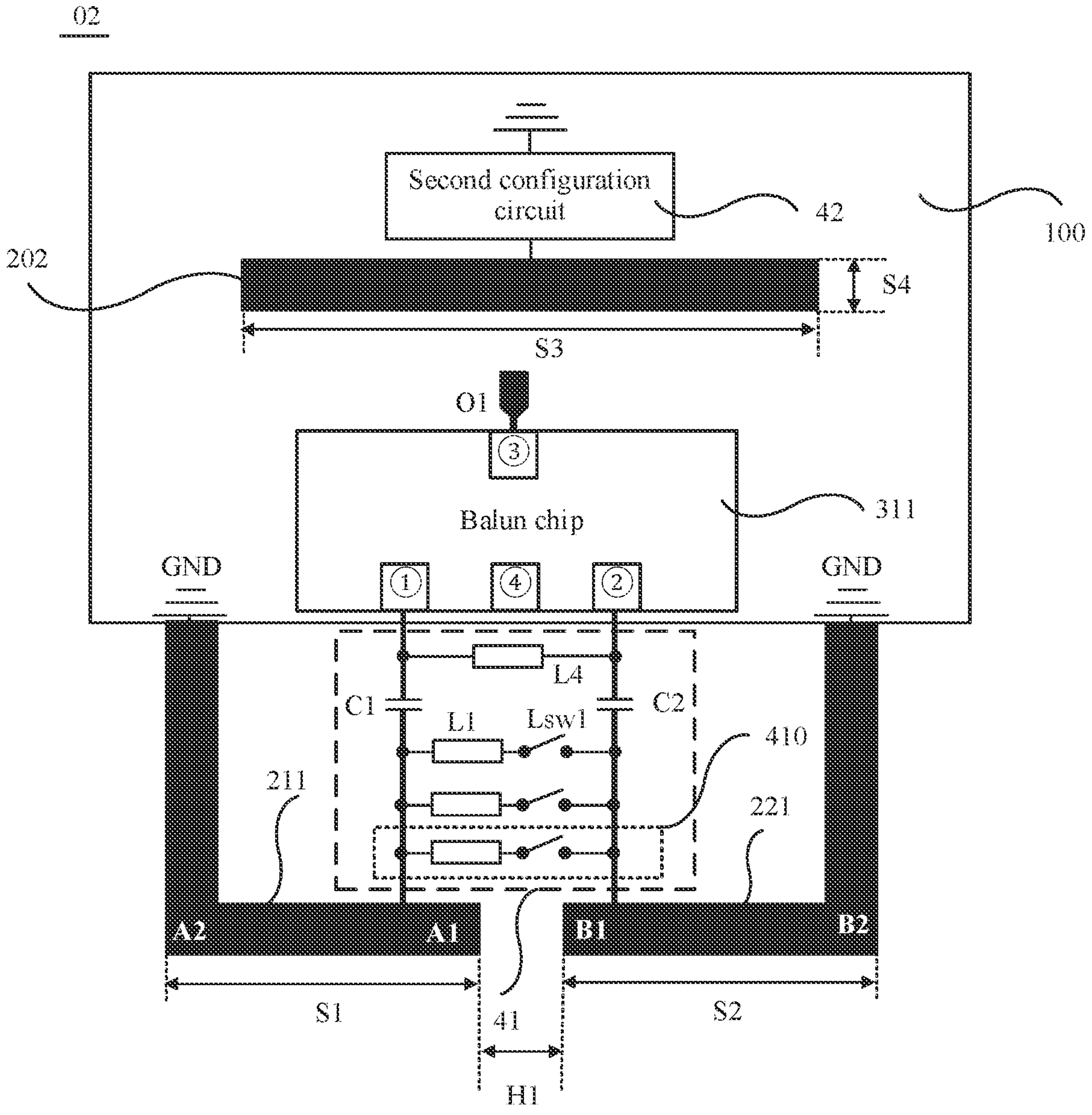
FIG. 6*c* is a schematic diagram of another disposing manner of a first configuration circuit in FIG. 6*a;*

Based on this, when the first feed circuit 31 excites the antenna body 20 to generate the first radiation mode RM1, to tune the resonance frequency of the antenna body 20 based on a requirement, in some embodiments of this application, as shown is FIG. 6c, the first configuration circuit 41 may further include at least two first tuning components 410.

The first timing component 410 is electrically connected between the second end of the first capacitor C1 and the second end of the second capacitor C2. The first tuning component 410 may include a first inductor L1 and a first radio frequency switch Lsw1 that are connected in series. One end of the first inductor L1 is electrically connected to the second end of the first capacitor C1 and the first stub 211, and the other end of the first inductor L1 is electrically connected to one end of the first radio frequency switch Lsw1. The other end of the first radio frequency switch Lsw1 is electrically connected to the second end of the second capacitor C2 and the second stub 221. Inductance values of first inductors L1 in different first tuning components 410 may be the same or may be different.

In this way, a quantity of first inductors L1 connected in parallel in the first configuration circuit 41 can be controlled by controlling on and off states of first radio frequency switches Lsw1. When the quantity of first inductors L1 connected in parallel in the first configuration circuit 41 is larger, inductive reactance between the first stub 211 and the second stub 221 is lower, and a resonance frequency of the antenna body 20 in the first radiation mode RM1 is higher; or when the quantity of first inductors L1 connected in parallel in the first configuration circuit 41 is smaller, inductive reactance between the first stub 211 and the second stub 221 is higher, and a resonance frequency of the antenna body 20 in the first radiation mode RM1 is lower.

The following describes the first radiation mode RM1 and the second radiation mode RM2 that are generated when the first feed circuit 31 excites the antenna body 20 as the first antenna by setting a structure size of the antenna body 20 and parameters of elements in the first configuration circuit 41.

For example, as shown in FIG. 6c, a length S1 of the first stub 211 (that is, a distance between the first end A1 and the second end A2 of the first stub 211) and a length S2 of the second stub 221 (that is, a distance between the first end B1 and the second end B2 of the second stub 221) may be approximately 17 mm±2 mm. The first gap H1 between the first stub 211 and the second stub 221 may be approximately 1.5 mm±0.5 mm.

Figure 6D:
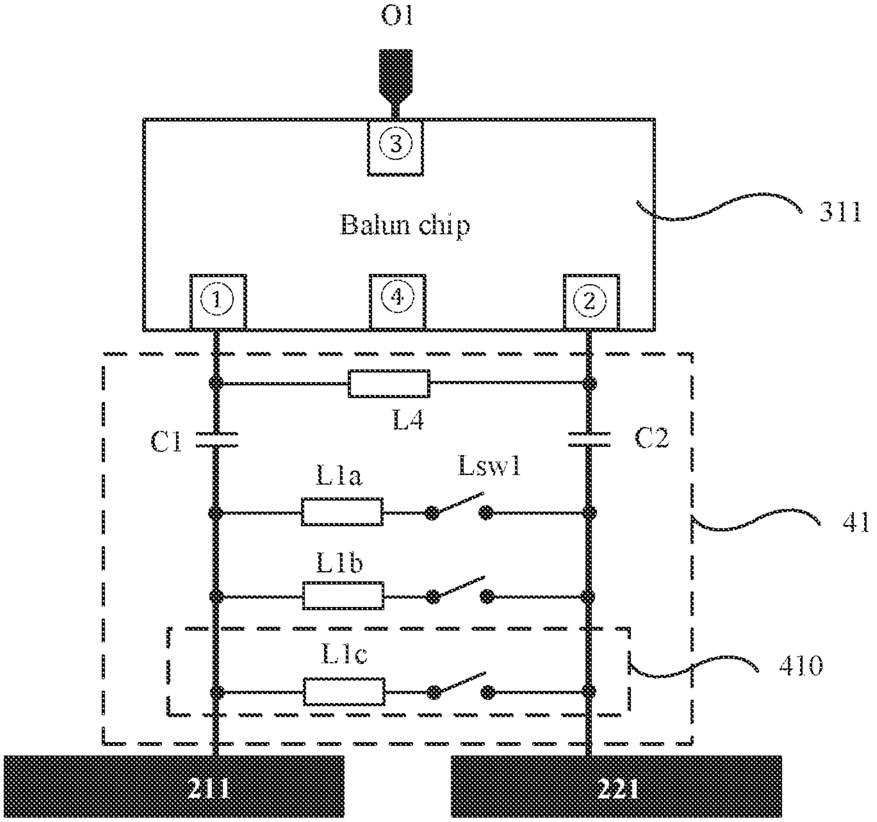
FIG. 6*d* is a schematic diagram of another disposing manner of a first configuration circuit in FIG. 6*a;*

A length S3 of the second radiator 202 may be approximately 36 mm±2 mm, and a width S4 of the second radiator 202 may be approximately 3 mm±1 mm. A material of the antenna chassis 300 (as shown in FIG. 2c) configured to support the second radiator 202 may be plastic. A dielectric constant of the plastic may be approximately 3. In addition, the back cover 12 (as shown in FIG. 1) of the electronic device 01 is located on a surface of a side that is of the second radiator 202 and that is away from the PCB 100. A material of the back cover 12 may be glass, and a dielectric constant of the glass is approximately 7. In addition, the parameters of the elements in the first configuration circuit 41 in FIG. 6d are shown in Table 1.

TABLE 1

| Capacitor | Element parameter | Inductor | Element parameter |
|---|---|---|---|
| C1 | 1 pF | L4 | 6 nH |
| C2 | 1 pF | L1a | 16 nH |
| | | L1b | 8 nH |
| | | L1c | 4 nH |

Table 1 is described by using an example in which three groups of first tuning components 410 are disposed in the first configuration circuit 41, and inductance values of first inductors (L1a, L1b, and L1c) in the first tuning components 410 are different. A quantity of first tuning components 410 in the first configuration circuit 41 and an inductance value of a first inductor in each first tuning component 410 are not limited in this application.

In this case, it can be learned from the foregoing that, when the antenna body 20 generates the first radiation mode RM1 under excitation of the first feed circuit 31, as shown in FIG. 4a, currents are mainly distributed on the first stub 211 and the second stub 221 in the first radiator 201, and the first configuration circuit 41 is disposed between the first stub 211 and the second stub 221. Therefore, an inductance value of each first inductor is set, and on and off of the first radio frequency switch Lsw1 in each first tuning component 410 is controlled, so that when the antenna body 20 is in the first radiation mode RM1, the radiation frequency of the antenna body 20 may cover a frequency range of 1710 MHz to 1880 MHz (that is, a Band 3 frequency hand), a frequency range of 1920 MHz to 2170 MHz (that is, a Band 1 frequency band), a frequency range of 2300 MHz to 2400 MHz (that is, a Band 40 frequency band), or a frequency range of 2500 MHz to 2690 MHz (that is, a Band 7 frequency band).

In addition, when the antenna body 20 generates the second radiation mode RM2 under excitation of the first feed circuit 31, as shown in FIG. 4b, currents are mainly distributed on the second radiator 202. In this case, by controlling the length S3 (as shown in FIG. 6c) of the second radiator 202, a resonance frequency of the antenna body 20 in the second radiation mode RM2 may be fixed at approximately one resonance frequency. When the length S3 of the second radiator 202 is greater, a resonance frequency of the antenna body 20 in the second radiation mode RM2 is lower; or when the length S3 of the second radiator 202 is smaller, the resonance frequency of the antenna body 20 in the second radiation mode RM2 is higher.

For example, when the length S3 of the second radiator 202 is approximately 36 mm±2 mm, the resonance frequency of the antenna body 20 in the second radiation mode RM2 may be approximately 2.7 GHz (50 MHz lower or higher).

Figure 7:
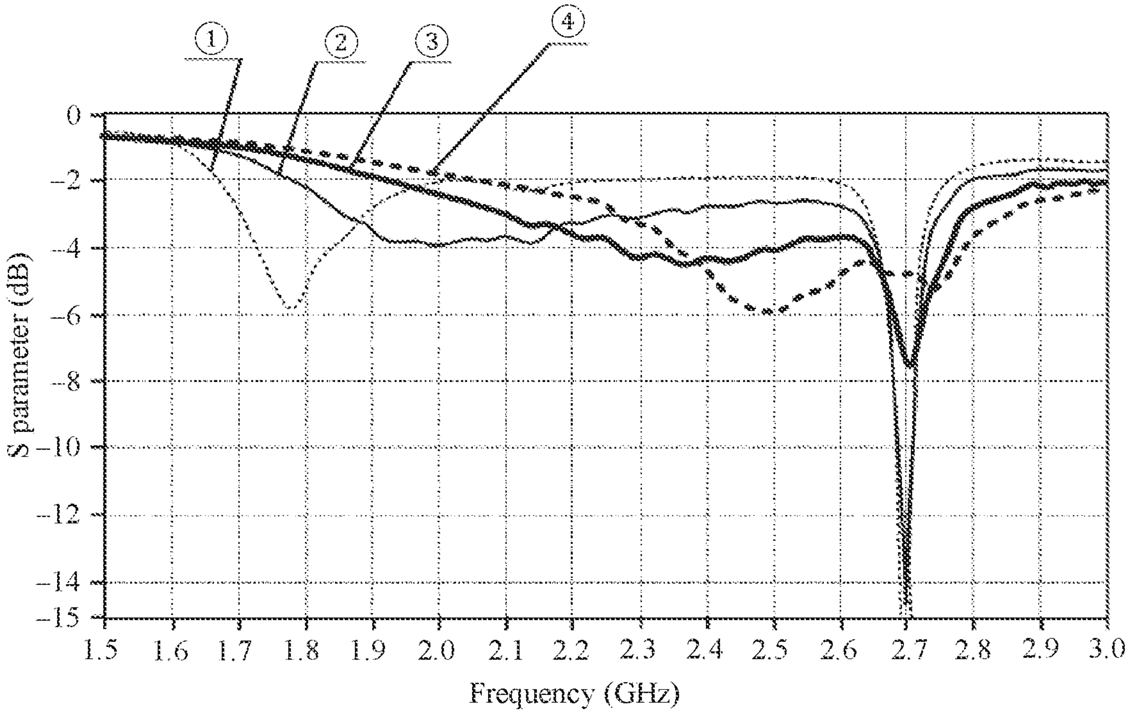
FIG. 7 is a curve graph in which an S parameter of an antenna body changes with a frequency according to an embodiment of this application.

In this case, as shown in FIG. 7, an S parameter curve ① has two resonance frequencies, which are respectively near 1.8 GHz and near 2.7 GHz. 1.8 GHz is in the foregoing Band 3 frequency band. An S parameter curve ② has two resonance frequencies, which are respectively near 2.0 GHz and near 2.7 GHz. 2.0 GHz is in the foregoing Band 1 frequency band. An S parameter curve ③ has two resonance frequencies, which are respectively near 2.4 GHz and near 2.7 GHz. 2.4 GHz is in the foregoing Band 40 frequency band. An S parameter curve ④ has two resonance frequencies, which are respectively near 2.5 (kHz and near 2.7 GHz. 2.5 GHz is in the foregoing Band 7 frequency band.

It can be learned from the foregoing description that, under excitation of the first feed circuit 31, when the antenna body 20 works in the first radiation mode RM1, in the first configuration circuit 41, the inductance value of the first inductor L1 and a quantity of a plurality of first inductors L1 connected in parallel may be adjusted based on a requirement, so that the resonance frequency of the antenna body 20 can be switched between the Band 3 frequency band, the Band 1 frequency band, the Band 40 frequency band, and the Band 7 frequency band. In this case, the antenna body 20 can cover a wide bandwidth.

It should be noted that, the foregoing description is provided by using an example in which the length S1 of the first stub 211 is the same as the length S2 of the second stub 221 in the first radiator 201, in some other embodiments of this application, a structure of the antenna body 20 and the circuit structure do not need to be set to a centrosymmetric structure. For example, when the length S1 of the first stub 211 is different from the length S2 of the second stub 221, the capacitance values of the first capacitor C1 and the second capacitor C2 in the first configuration circuit 41 may be adjusted, to reduce mutual impact between different radiation modes of the antenna body 20, and improve isolation of antennas in the different radiation modes.

Figure 8:
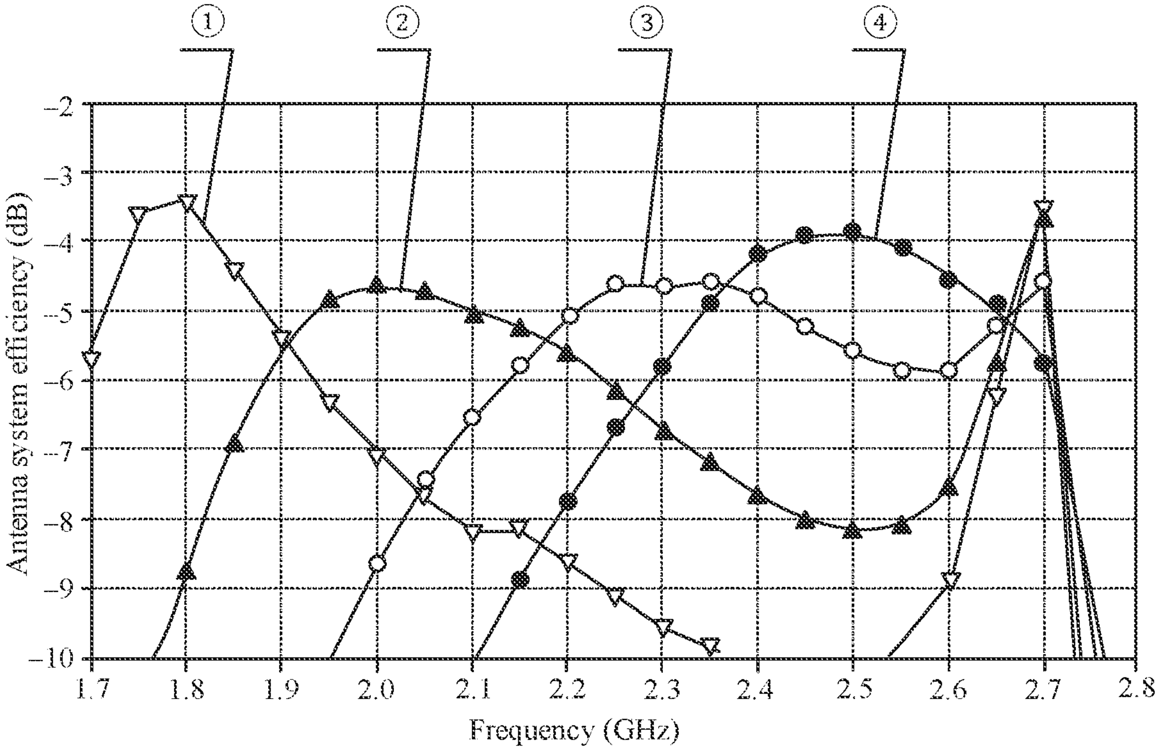
FIG. 8 is a curve graph in which antenna system efficiency changes with a frequency according to an embodiment of this application.

In addition, as shown in FIG. 8, it can be seen from an antenna system efficiency curve ① of a resonance frequency of the antenna body 20 in the Band 3 frequency band that, the resonance frequency of the antenna body 20 is near 1.8 GHz, and system efficiency of the antenna body 20 is higher than −4 dB. It can be seen from an antenna system efficiency curve ② of a resonance frequency of the antenna body 20 in the Band 1 frequency band that, the resonance frequency of the antenna body 20 is near 2.0 GHz, and system efficiency of the antenna body 20 is higher than −5 dB. It can be seen from an antenna system efficiency curve ③ of a resonance frequency of the antenna body 20 in the Band 40 frequency band that, the resonance frequency of the antenna body 20 is near 2.4 GHz, and system efficiency of the antenna body 20 is higher than −5 dB. It can be seen from an antenna system efficiency curve ④ of a resonance frequency of the antenna body 20 in the Band 7 frequency band that, the resonance frequency of the antenna body 20 is near 2.7 GHz, and system efficiency of the antenna body 20 is higher than −6 dB. Therefore, in the first radiation mode RM1, when frequencies of signals radiated by the antenna body 20 are at the resonance frequencies in the frequency bands that can be covered by the antenna body 20, system efficiency may be lower than −6 dB, and system efficiency is high.

The foregoing describes setting and adjustment of resonance frequencies of the antenna body 20 in the first radiation mode RM1 and the second radiation mode RM2 under excitation of the first feed circuit 31. In addition, it can be learned from the foregoing description that, under excitation of the second feed circuit 32, the antenna body 20 may generate the third radiation mode RM3 shown in FIG. 5*a*. In this mode, although the first radiator 201 is used as a main radiator, in this case, a magnitude of inductive reactance of the first configuration circuit 41 (as shown in FIG. 6*a*) that is electrically connected between the first output end ① and the second output end ② of the signal conversion circuit 311 (or between the first stub 211 and the second stub 221) basically does not affect a resonance frequency of the antenna body 20 in the third radiation mode RM3.

Therefore, in the third radiation mode RM3, the resonance frequency of the antenna body 20 cannot be tuned by using the first configuration circuit 41. In this case, the length S1 of the first stub 211 and the length S2 of the second stub 221 in the first radiator 201 that are shown in FIG. 6*c* may be set, so that the resonance frequency of the antenna body 20 in the third radiation mode RM3 is fixed at approximately one resonance frequency. When the length S1 of the first stub 211 and the length S2 of the second stub 221 are greater, the resonance frequency of the antenna body 20 in the third radiation mode RM3 is lower; or when the length S1 of the first stub 211 and the length S2 of the second stub 221 are smaller, the resonance frequency of the antenna body 20 in the third radiation mode RM3 is higher. For example, if L1=L2=17 mm±2 mm, the resonance frequency of the antenna body 20 in the third radiation mode RM3 may be fixed in the Band 7 frequency band (that is, a frequency range of 2500 MHz to 2690 MHz).

Figure 9:
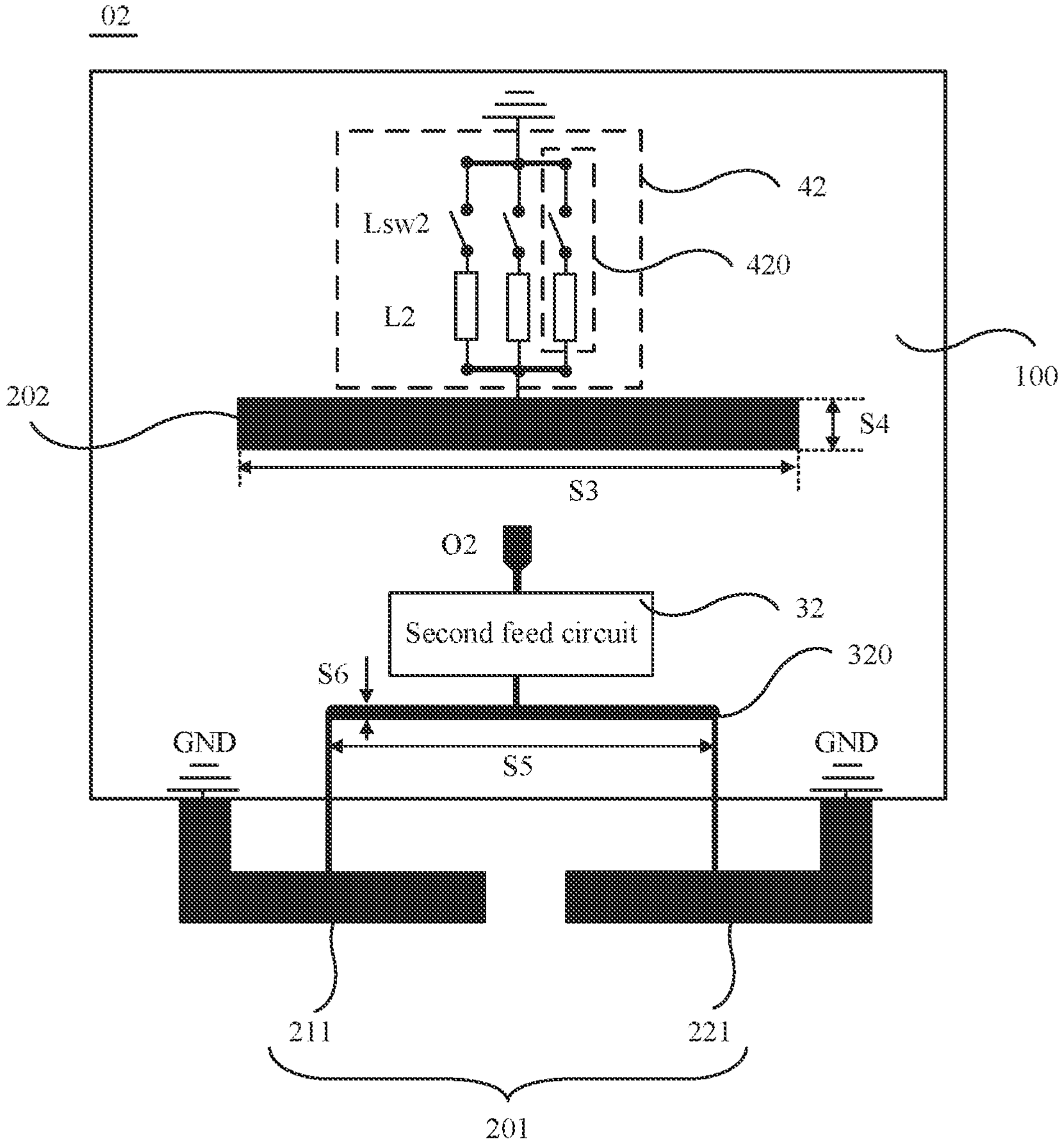
FIG. 9 is a schematic diagram of another structure of an antenna apparatus according to an embodiment of this application.

In addition, as shown in FIG. 9, to enable the second feed circuit 32 to feed the first radiator 201, a cable 320 may be formed on the PCB 100 (a material of the PCB 100 may be FR4). When the PCB 100 includes a plurality of layers of sub-circuit boards, a clearance height of the cable 320 on the PCB 100 may be a thickness of one layer of sub-circuit board. Based on this, in some embodiments of this application, a length S5 of the cable 320 may be approximately 18 mm±2 mm, and a width S6 of the cable may be approximately 0.5 mm±0.2 mm.

To enable a resonance frequency of the antenna body 20 in the fourth radiation mode RM4 to be tuned based on a requirement under excitation of the second feed circuit 32, in some embodiments of this application, as shown in FIG. 9, the second configuration circuit 42 configured to electrically connect the second radiator 202 to the reference ground GND of the PCB 100 may include at least two second tuning components 420.

The second tuning component 420 is electrically connected between the center of the second radiator 202 and the reference ground GND of the PCB 100. Each second tuning component 420 may include a second inductor L2 and a second radio frequency switch Lsw2 that are connected in series. One end of the second inductor L2 is electrically connected to the center of the second radiator 202, and the other end of the second inductor L2 is electrically connected to one end of the second radio frequency switch Lsw2. The other end of the second radio frequency switch Lsw2 is electrically connected to the reference ground GND of the PCB 100. Alternatively, in some other embodiments of this application, one end of the second radio frequency switch Lsw2 is electrically connected to the center of the second radiator 202, the other end of the second radio frequency switch Lsw2 is electrically connected to one end of the second inductor L2, and the other end of the second inductor L2 is electrically connected to the reference ground GND of the PCB 100.

In this way, a quantity of second inductors L2 connected in parallel in the second configuration circuit 42 can be controlled by controlling on and off states of second radio frequency switches Lsw2. When a quantity of second inductors L2 connected in parallel in the second configuration circuit 42 is larger, inductive reactance between the second radiator 202 and the reference ground GND of the PCB 100 is lower, and the resonance frequency of the antenna body 20 in the fourth radiation mode RM4 is higher; or when a quantity of second inductors L2 connected in parallel in the second configuration circuit 42 is smaller; inductive reactance between the second radiator 202 and the reference ground GND of the PCB 100 is higher, and the resonance frequency of the antenna body 20 in the fourth radiation mode RM4 is lower.

Inductance values of second inductors L2 in different second tuning components 420 in the second configuration circuit 42 are not limited in this application. Inductance values of the second inductors L2 in the different second tuning components 420 may be the same or may be different. In some embodiments of this application, an inductance value of each second inductor L2 may be set, and on and off of the second radio frequency switch Lsw2 in each second tuning component 420 may be controlled, so that when the antenna body 20 is in the fourth radiation mode RM4, the radiation frequency of the antenna body 20 may cover the Band 3 frequency band (that is, a frequency range of 1710 MHz to 1880 MHz), the Band 1 frequency band (that is, a frequency range of 1920 MHz to 2170 MHz), and/or the Band 7 frequency band (that is, a frequency range of 2500 MHz to 2690 MHz). The following describes the third radiation mode RM3 and the fourth radiation mode RM4 that are generated when the second feed circuit 32 excites the antenna body 20 as the second antenna.

Figure 10A:
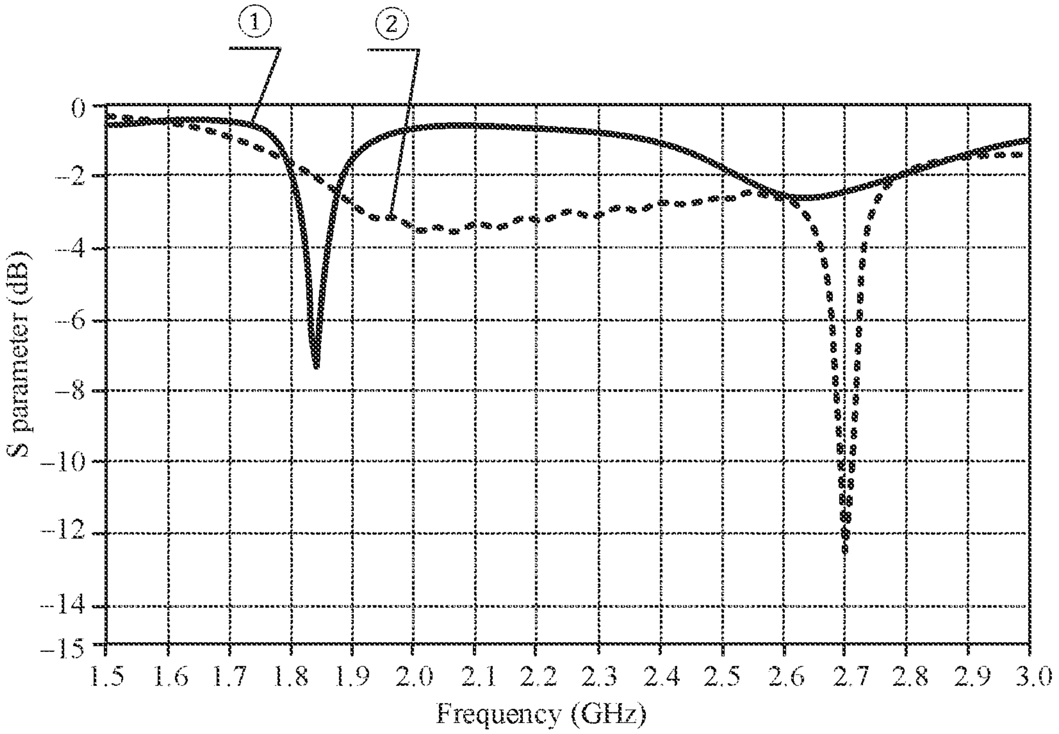
FIG. 10*a* is another curve graph in which an S parameter of an antenna body changes with a frequency according to an embodiment of this application.
Figure 10B:
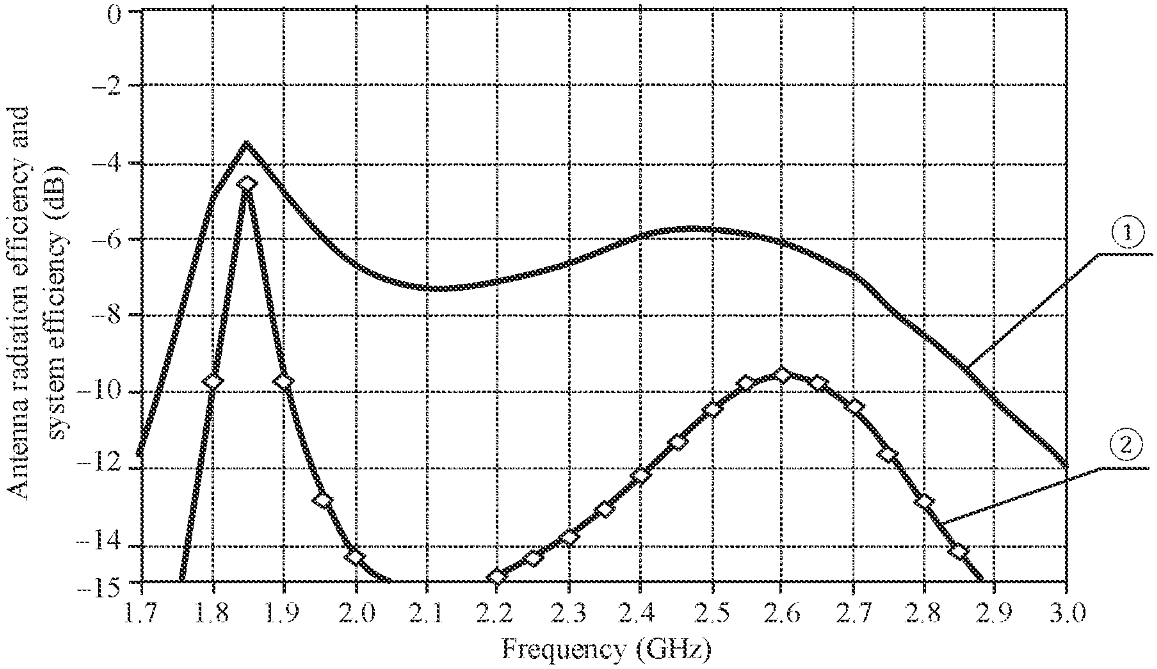
FIG. 10*b* is a curve graph in which antenna radiation efficiency and system efficiency change with a frequency according to an embodiment of this application.

In this case, as shown in FIG. 10*a*, a curve ① is an S parameter curve of the antenna body 20 under excitation of the second feed circuit 32. In this case, the resonance frequency of the antenna body 20 in the fourth radiation mode RM4 is near 1.8 GHz, that is, in the foregoing Band 3 frequency band. The resonance frequency of the antenna body 20 in the third radiation mode RM3 is near 2.7 GHz, that is, in the foregoing Band 7 frequency band. Therefore, under the excitation of the second feed circuit 32, a radiation mode of the antenna body 20 may cover the Band 3 frequency band (the fourth radiation mode RM4) and the Band 7 frequency band (the third radiation mode RM3). A curve ② is an S parameter curve of the antenna body 20 under excitation of the first feed circuit 31. As shown in FIG. 10*b*, it can be seen from a radiation efficiency curve of the antenna body 20 that, when the antenna body 20 is in the Band 3 frequency band, a resonance frequency of the antenna body 20 is near 1.8 GHz, and radiation efficiency is higher than −4 dB. When the antenna body 20 is in the Band 7 frequency band, a resonance frequency of the antenna body 20 is near 2.7 GHz, and radiation efficiency is near −6 dB, which indicates high radiation efficiency. In addition, it can be seen from a system efficiency curve ② of the antenna body 20 that, when the antenna body is in the Band 3 frequency band, a resonance frequency of the antenna body 20 is near 1.8 GHz, and system efficiency of the antenna body 20 is near −5 dB. When the antenna body 20 is in the Band 7 frequency band, a resonance frequency of the antenna body 20 is near 2.7 GHz, and system efficiency is near −10 dB. Because under excitation of the second feed circuit 32, the antenna body 20 may be mainly used as the second antenna to receive downlink data, when the antenna system efficiency is near −10 dB, a requirement can also be met.

Figure 11A:
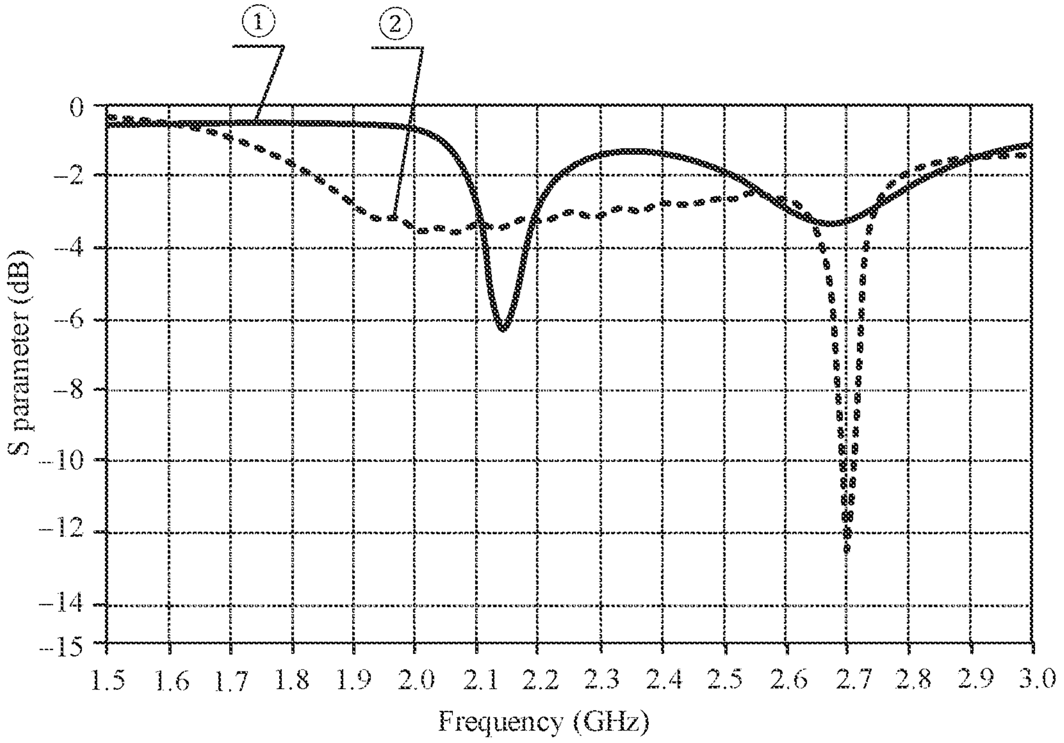
FIG. 11*a* is another curve graph in which an S parameter of an antenna body changes with a frequency according to an embodiment of this application.

In addition, as shown in FIG. 11*a*, a curve ① is an S parameter curve of the antenna body 20 under excitation of the second feed circuit 32. In this case, the resonance frequency of the antenna body 20 in the fourth radiation mode RM4 is near 2.1 GHz, that is, in the foregoing Band 1 frequency band. The resonance frequency of the antenna body 20 in the third radiation mode RM3 is near 2.7 GHz, that is, in the foregoing Band 7 frequency band. Therefore, under the excitation of the second feed circuit 32, a radiation mode of the antenna body 20 may cover the Band 1 frequency band (the fourth radiation mode RM4) and the Band 7 frequency band (the third radiation mode RM3). A curve ② is an S parameter curve of the antenna body 20 under excitation of the first feed circuit 31.

Figure 11B:
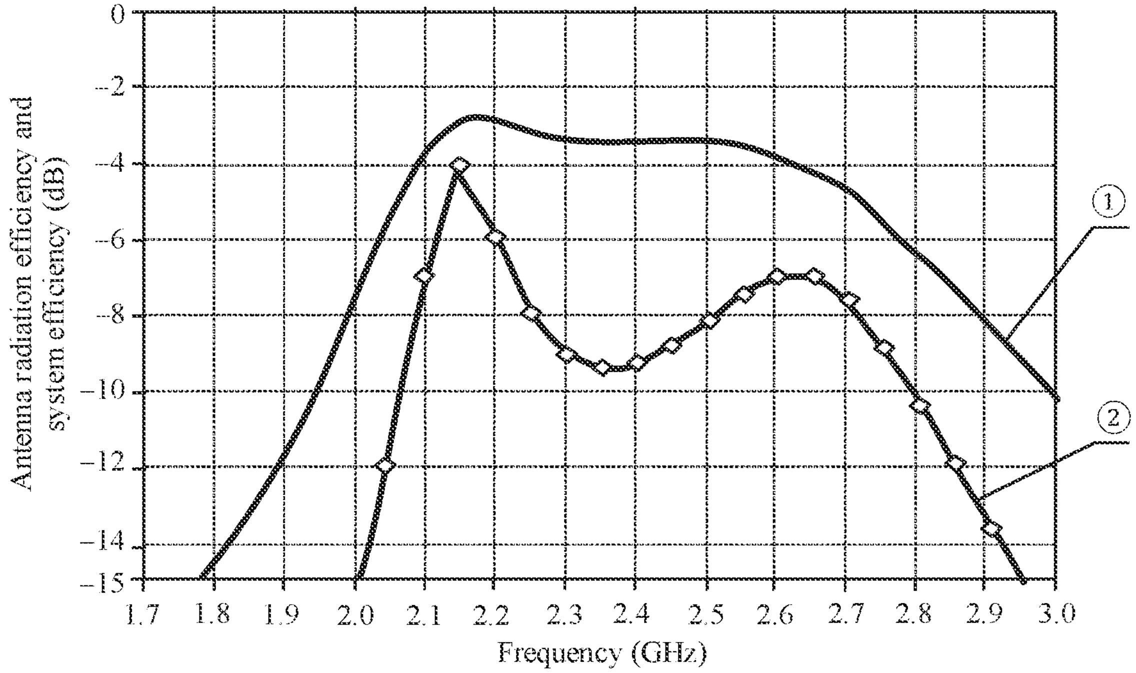
FIG. 11*b* is a curve graph in which antenna radiation efficiency and system efficiency change with a frequency according to an embodiment of this application.

As shown in FIG. 11*b*, it can be seen from a radiation efficiency curve ① of the antenna body 20 that, when the antenna body 20 is in the Band 1 frequency band, a resonance frequency of the antenna body 20 is near 2.1 GHz, and radiation efficiency is higher than −6 dB. When the antenna body 20 is in the Band 7 frequency band, a resonance frequency of the antenna body 20 is near 2.7 GHz, and radiation efficiency is higher than −6 dB, which indicates high radiation efficiency. In addition, it can be seen from a system efficiency curve ② of the antenna body 20 that, when the antenna body is in the Band 1 frequency band, a resonance frequency of the antenna body 20 is near 2.1 GHz, and system efficiency of the antenna body 20 is near −4 dB. When the antenna body 20 is in the Band 7 frequency band, a resonance frequency of the antenna body 20 is near 2.7 GHz, and system efficiency is higher than −8 dB, which indicates high system efficiency.

Figure 12A:
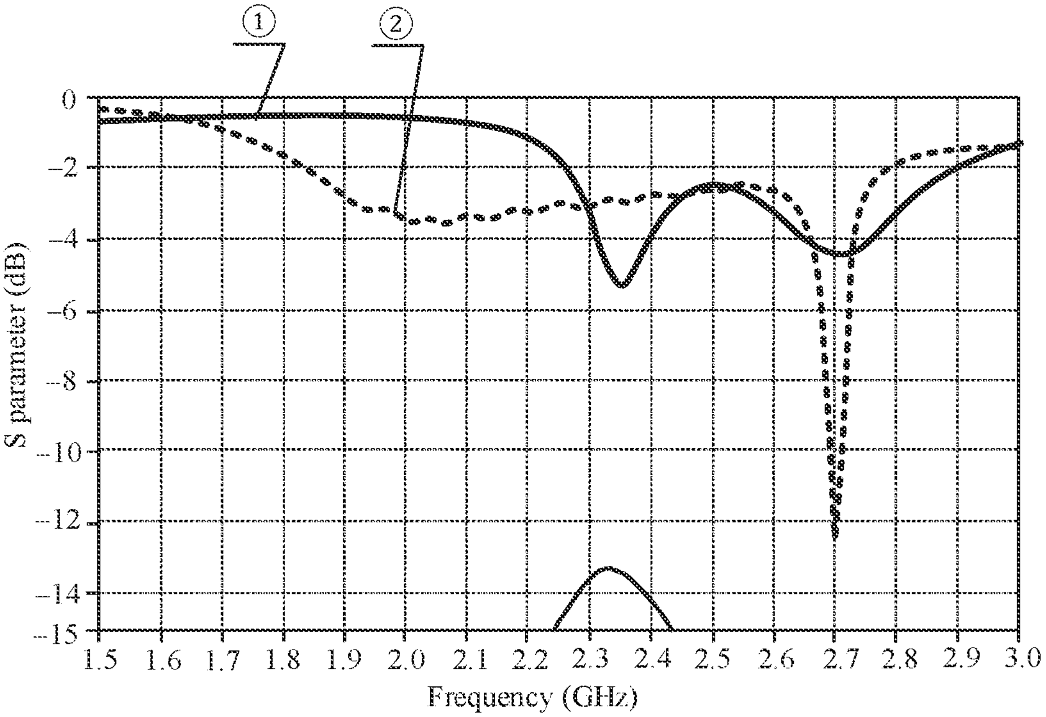
FIG. 12*a* is another curve graph in which an S parameter of an antenna body changes with a frequency according to an embodiment of this application.

In addition, as shown in FIG. 12*a*, a curve ① is an S parameter curve of the antenna body 20 under excitation of the second feed circuit 32. In this case, the resonance frequency of the antenna body 20 in the fourth radiation mode RM4 is near 2.4 GHz, that is, near the foregoing Band 7 frequency band. The resonance frequency of the antenna body 20 in the third radiation mode RM3 is near 2.7 GHz, that is, in the foregoing Band 7 frequency hand. Therefore, a radiation mode of the antenna body 20 under excitation of the second feed circuit 32 covers the Band 7 frequency band, so that a bandwidth can be increased. A curve ② is an S parameter curve of the antenna body 20 under excitation of the first feed circuit 31. In addition, isolation between the formed second antenna and the first antenna is high under separate excitation of the second feed circuit 32 and the first feed circuit 31. As shown by a thin solid line in FIG. 12*a*, the isolation may be approximately 13 dB.

Figure 12B:
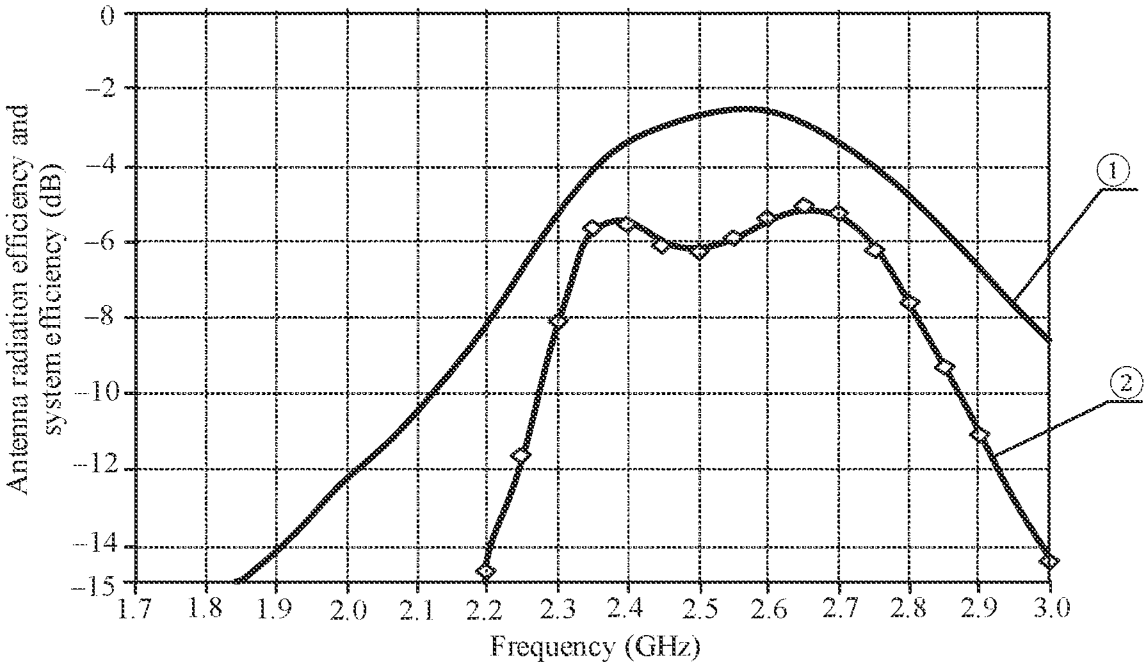
FIG. 12*b* is a curve graph in which antenna radiation efficiency and system efficiency change with a frequency according to an embodiment of this application.

As shown in FIG. 12*b*, it can be seen from a radiation efficiency curve ② of the antenna body 20 that, when the antenna body 20 is in the Band 7 frequency band and near the Band 7 frequency band, radiation efficiency is higher than −6 dB. It can be seen from a system efficiency curve ② of the antenna body 20 that, when the antenna body 20 is in the Band 7 frequency band and near the Band 7 frequency band, system efficiency of the antenna body 20 is approximately − 6 dB, which indicates high system efficiency.

It can be learned from the foregoing description that, under excitation of the second feed circuit 32, when the antenna body 20 works in the fourth radiation mode RM4, in the second configuration circuit 42, the inductance value of the second inductor L2 and a quantity of second inductors L2 connected in parallel may be adjusted based on a requirement, so that the resonance frequency of the antenna body 20 can be switched between the Band 3 frequency band, the Band 1 frequency band, and the Band 7 frequency band. In this case, the antenna body 20 can cover a wide bandwidth.

It should be noted that, as shown in FIG. 10*a*, FIG. 11*a*, and FIG. 12*a*, when a parameter of a component in the second configuration circuit 42 is changed, and a resonance frequency of the second antenna (formed under excitation of the second feed circuit 32) is tuned, a resonance frequency of the first antenna (formed under excitation of the first feed circuit 31) does not change with a change of the parameter of the component in the second configuration circuit 42. Similarly, when a parameter of a component in the first configuration circuit 41 is changed, and a resonance frequency of the first antenna is tuned, a resonance frequency of the second antenna does not change with a change of the parameter of the component in the first configuration circuit 41. The two antennas can be tuned independently.

An example is used above to describe a structure of the antenna body 20 and a manner of setting an internal element, in which when the antenna body 20 is in the first radiation mode RM1 and when the antenna body 20 is excited by the first feed circuit 31, the inductance value of the first inductor L1 and the quantity of first inductors L1 connected in parallel may be adjusted in the first configuration circuit 41, to implement an adjustable resonance frequency, for example, switching between the Band 3 frequency band, the Band 1 frequency band, the Band 40 frequency band, and the Band 7 frequency band; and when the antenna body 20 is in the fourth radiation mode RM4 and when the antenna body 20 is excited by the second feed circuit 32, the inductance value of the second inductor L2 and the quantity of second inductors L2 connected in parallel may be adjusted in the second configuration circuit 42, to implement an adjustable resonance frequency, for example, switching between the Band 3 frequency band, the Band 1 frequency band, and the Band 7 frequency band.

In some other embodiments of this application, a structure and an internal element of the antenna body 20 may be set, so that a radiation frequency of the antenna body 20 may be fixed at an N41 frequency band (a frequency range of 2500 MHz to 2700 MHz) and an N78 frequency band (3300 MHz to 3800 MHz). When the antenna body 20 includes the first configuration circuit 41 shown in FIG. 6*a*, the first configuration circuit 41 may include a third capacitor C3 and a fourth capacitor C4 shown in FIG. 13*a*. A first end of the third capacitor C3 is electrically connected to the first output end ① of the signal conversion circuit 311, and a second end of the third capacitor C3 is electrically connected to the first stub 211. A first end of the fourth capacitor C4 is electrically connected to the second output end ② of the signal conversion circuit 311, and a second end of the fourth capacitor C4 is electrically connected to the second stub 221.

It can be learned from the foregoing that, when the antenna body 20 works in the first radiation mode RM1 under excitation of the first feed circuit 31 (including a balun chip in FIG. 13*a*), the first radiator 201 (including the first stub 211 and the second stub 221 in FIG. 13*a*) is used as a main radiator. In this case, when capacitance values of the third capacitor C3 and the fourth capacitor C4 in the first configuration circuit 41 are larger and the length S1 of the first stub 211 and the length S2 of the second stub 221 are greater, a resonance frequency of the antenna body 20 in the first radiation mode RM1 is lower; or when capacitance values of the third capacitor C3 and the fourth capacitor C4 in the first configuration circuit 41 are smaller and the length S1 of the first stub 211 and the length S2 of the second stub 221 are smaller, a resonance frequency of the antenna body 20 in the first radiation mode RM1 is higher.

Figure 13A:
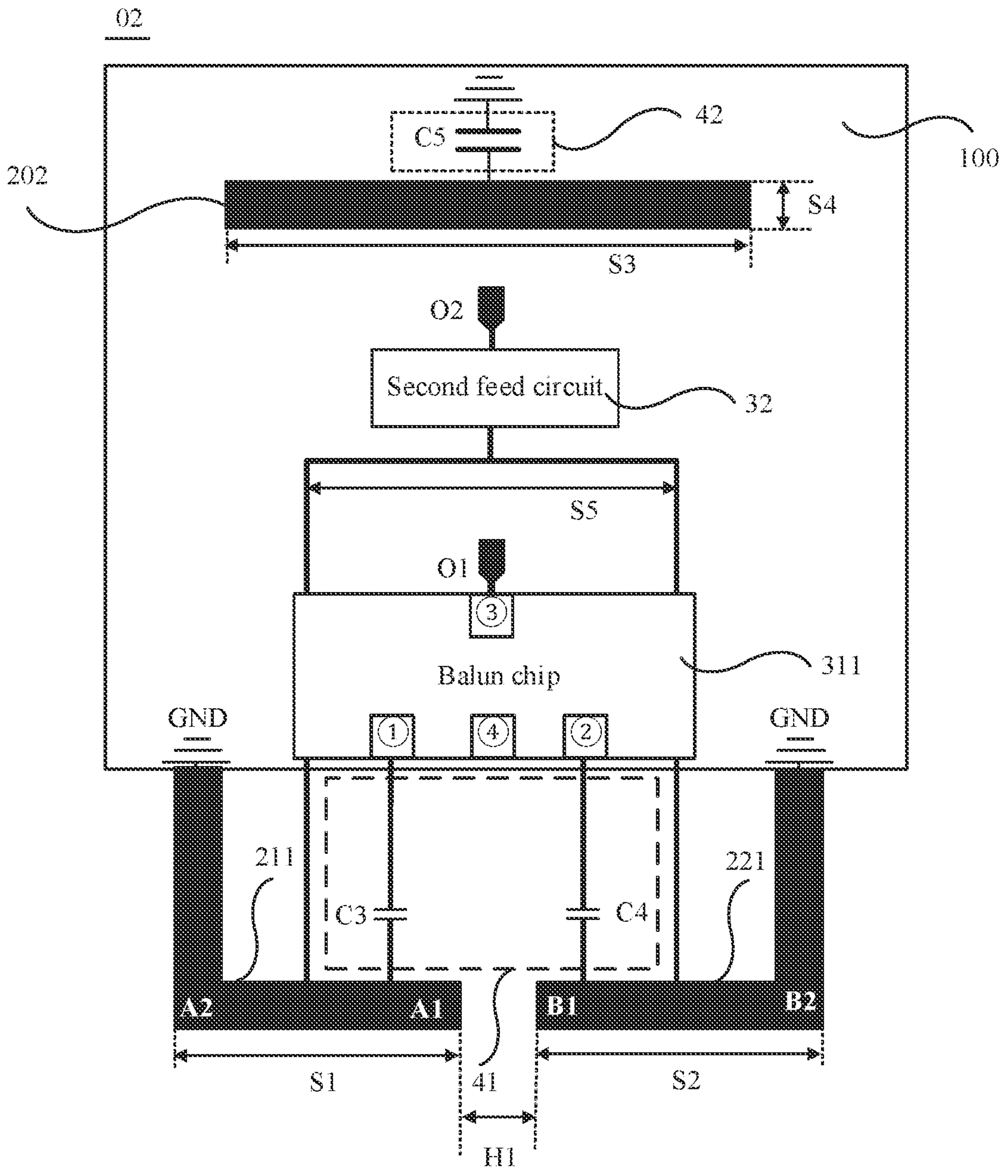
FIG. 13*a* is another schematic diagram of a structure of an antenna apparatus according to an embodiment of this application.
Figure 13B:
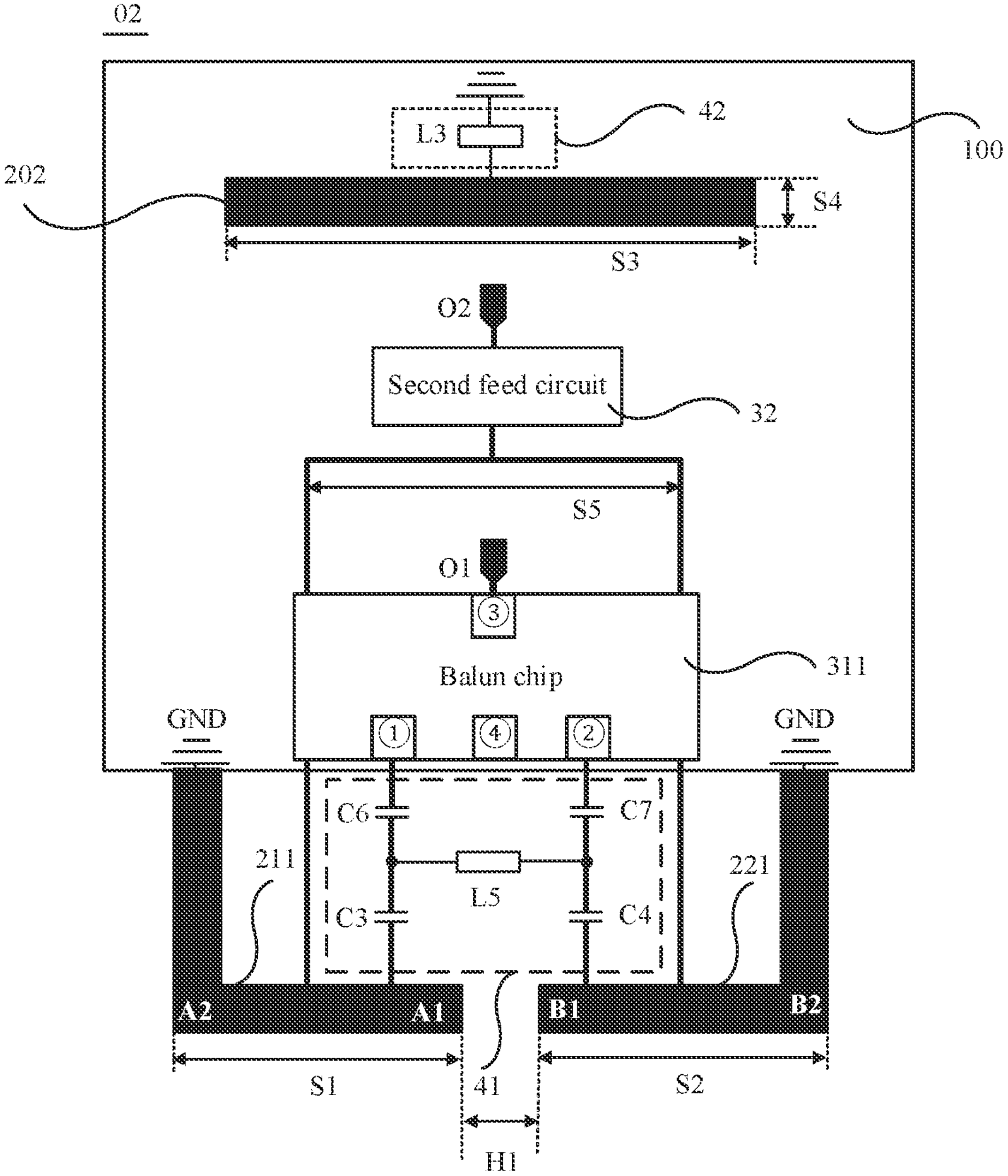
FIG. 13*b* is another schematic diagram of a structure of an antenna apparatus according to an embodiment of this application.

In addition, in some other embodiments of this application, the first configuration circuit 41 may include a sixth capacitor C6, a seventh capacitor C7, and a fifth inductor L5 shown in FIG. 13*b*. A first end of the sixth capacitor C6 is electrically connected to the first output end ① of the signal conversion circuit 311, and a second end of the sixth capacitor C6 is electrically connected to the first end of the third capacitor C3. A first end of the seventh capacitor C7 is electrically connected to the second output end ② of the signal conversion circuit 311, and a second end of the seventh capacitor C7 is electrically connected to the first end of the fourth capacitor C4. A first end of the fifth inductor L5 is electrically connected to the second end of the sixth capacitor C6, and a second end of the fifth inductor L5 is electrically connected to the second end of the seventh capacitor C7. The sixth capacitor C6, the seventh capacitor C7, and the fifth inductor L5 may be configured to tune a bandwidth of the antenna body 20. For example, when capacitance values of the sixth capacitor C6 and the seventh capacitor C7 are smaller and an inductance value of the fifth inductor L5 is larger, the bandwidth of the antenna body 20 is wider; or when capacitance values of the sixth capacitor C6, and the seventh capacitor C7 are larger and an inductance value of the fifth inductor L5 is smaller, the bandwidth of the antenna body 20 is narrower.

Figure 13C:
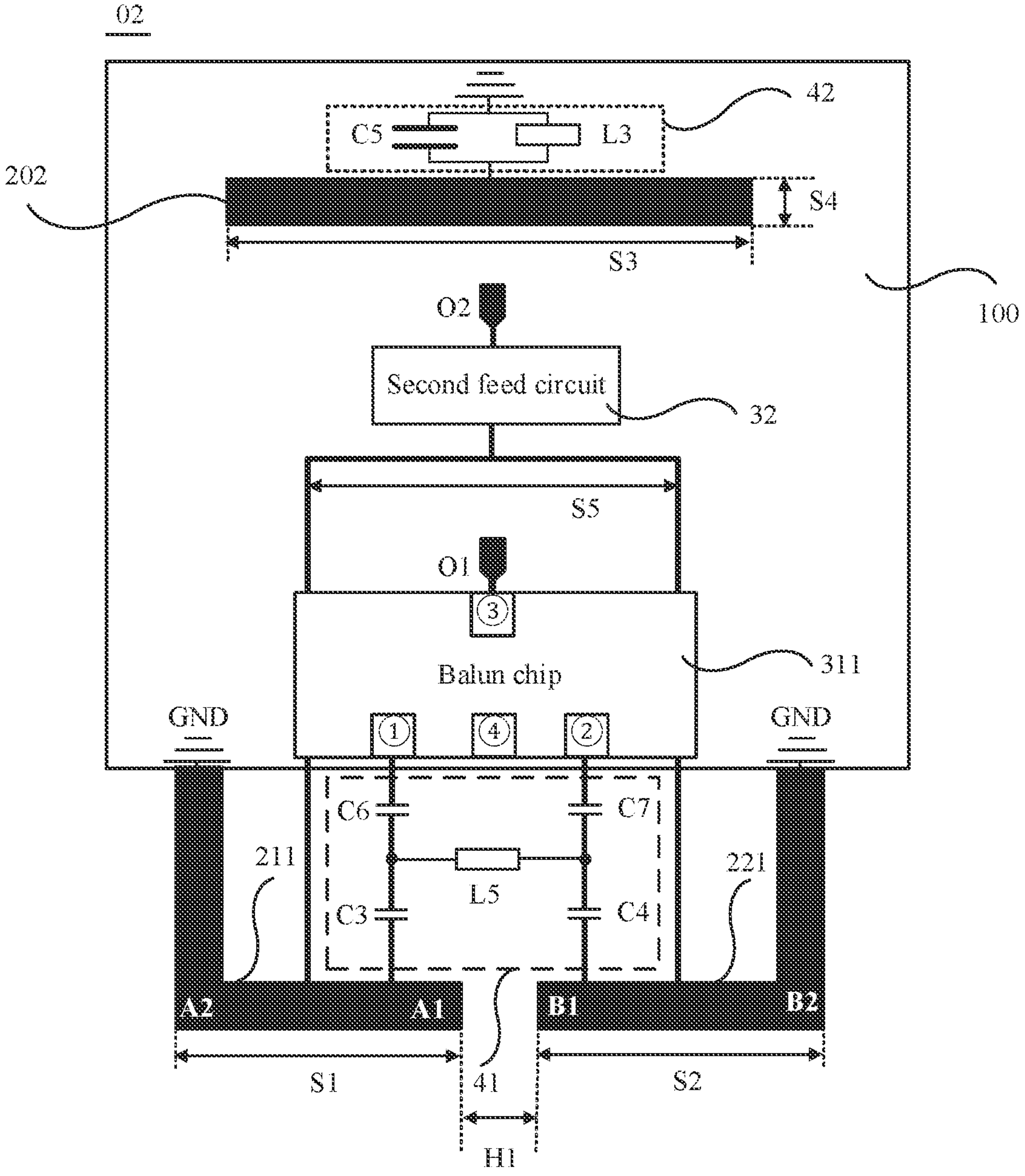
FIG. 13*c* is another schematic diagram of a structure of an antenna apparatus according to an embodiment of this application.

In addition, in some embodiments of this application, the second configuration circuit 42 may include a fifth capacitor C5 shown in FIG. 13*a*. A first end of the fifth capacitor C5 is electrically connected to the center of the second radiator 202, and a second end of the fifth capacitor C5 is grounded to the reference ground GND of the PCB 100. Alternatively, in some embodiments of this application, the second configuration circuit 42 may include a third inductor L3 shown in FIG. 13*b*. A first end of the third inductor L3 is electrically connected to the center of the second radiator 202, and a second end of the third inductor L3 is grounded to the reference ground GND of the PCB 100. Alternatively, in some embodiments of this application, as shown in FIG. 13*c*, the second configuration circuit 42 may include the fifth capacitor C5 and the third inductor L3. For ease of description, an example is used below for description in which the second configuration circuit 42 includes the fifth capacitor C5.

When the antenna body 20 works in the second radiation mode RM2 under excitation by the first feed circuit 31, the second radiator 202 is used as a main radiator. When the length S3 of the second radiator 202 is greater, a resonance frequency of the antenna body 20 in the second radiation mode RM2 is lower; or when the length S3 of the second radiator 202 is smaller, the resonance frequency of the antenna body 20 in the second radiation mode RM2 is higher.

When the first feed circuit 31 excites the antenna body 20, a radiation frequency of the antenna body 20 in the first radiation mode RM1 is enabled to cover an N41 frequency band (a frequency range of 2500 MHz to 2700 MHz) and a first half (3300 MHz to 3600 MHz) of an N78 frequency band, and a radiation frequency of the antenna body 20 in the second radiation mode RM2 may be enabled to cover a second half (3600 MHz to 3800 MHz) of an N78 frequency band. Based on this, the following describes a manner of setting a structure size of the antenna body 20.

For example, in FIG. 13*c*, the length S1 of the first stub 211 and the length S2 of the second stub 221 may be approximately 11 mm±2 mm. The first gap H1 between the first stub 211 and the second stub 221 may be approximately 1.5 mm±0.5 mm. A length S3 of the second radiator 202 may be approximately 23 mm±2 mm. A material of the antenna chassis 300 (as shown in FIG. 2*c*) configured to support the second radiator 202 may be plastic. A dielectric constant of the plastic may be approximately 3. In addition, the back cover 12 (as shown in FIG. 1) of the electronic device 01 is located on the surface of the side that is of the second radiator 202 and that is away from the PCB 100. A material of the back cover 12 may be glass, and a dielectric constant of the glass is approximately 7. In addition, the length S5 of the cable 320 configured to electrically connect the second feed circuit 32 to the first radiator 201 may be approximately 18 mm±2 mm, and the width S6 of the cable 320 may be approximately 0.5 mm±0.2 mm.

Based on this, in FIG. 13*c*, parameters of elements in the second configuration circuit 42 and the first configuration circuit 41 are shown in Table 2.

TABLE 2

| Capacitor | Element parameter | Inductor | Element parameter |
|---|---|---|---|
| C6 | 0.6 pF ± 0.1 pF | L5 | 7 nH ± 1 nH |
| C7 | 0.6 pF ± 0.1 pF | | |
| C3 | 0.4 pF ± 0.1 pF | | |
| C4 | 0.4 pF ± 0.1 pF | | |
| C5 | 2 pF ± 0.5 pF | | |

Figure 14:
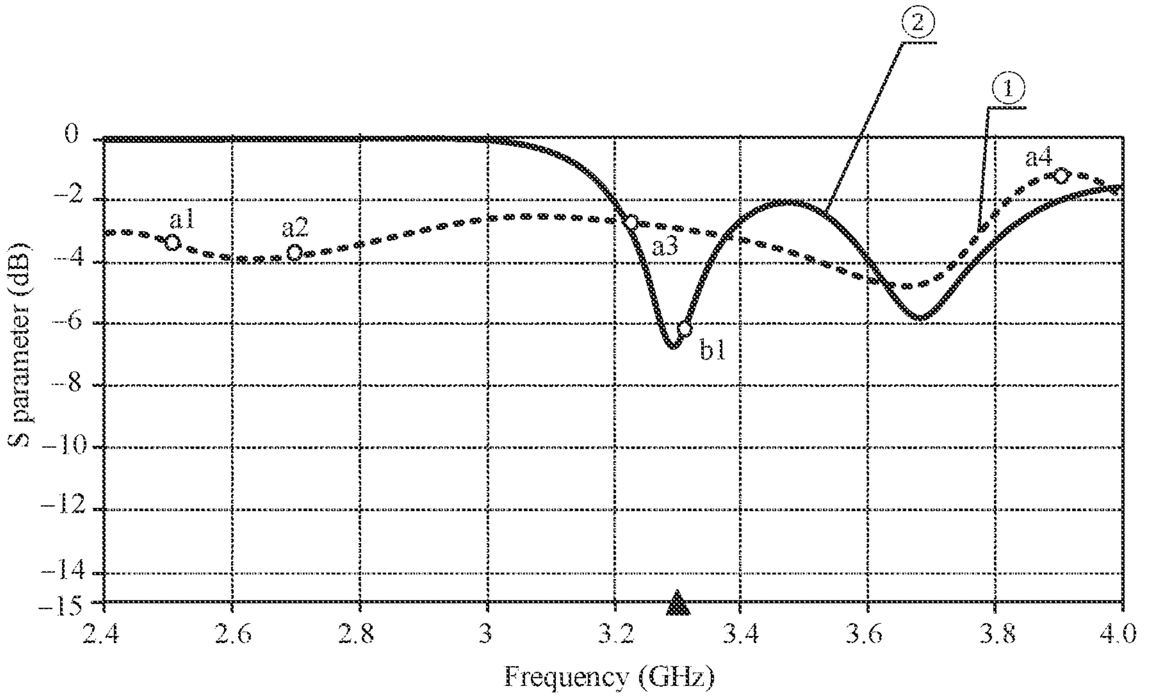
FIG. 14 is another curve graph in which an S parameter of an antenna body changes with a frequency according to an embodiment of this application.

In this case, as shown in FIG. 14, a curve ① is an S parameter curve of the antenna body 20 under excitation of the first feed circuit 31. It can be seen that, in the curve ①, a resonance frequency at a point a1 is approximately 2.5 GHz, a resonance frequency at a point a2 is approximately 2.7 GHz, and a resonance frequency at a point a3 is approximately 3.2 GHz. Therefore, it may be noted that the radiation frequency of the antenna body 20 in the first radiation mode RM1 may cover the N41 frequency band (a frequency range of 2500 MHz to 2700 MHz) and a first half of the N78 frequency band (3300 MHz to 3600 MHz).

In addition, a resonance frequency at a point a4 in the curve ① is approximately 3.9 GHz. Therefore, it may be indicated that a radiation frequency of the antenna body 20 in the second radiation mode RM2 may cover a second half (3600 MHz to 3800 MHz) of the N78 frequency band. Therefore, under excitation of the first feed circuit 31, radiation frequencies of the antenna body 20 used as the first antenna in the first radiation mode RM1 and the second radiation mode RM2 may cover the N41 frequency band (a frequency range of 2500 MHz to 2700 MHz) and the N78 frequency band (3300 MHz to 3800 MHz).

Figure 15A:
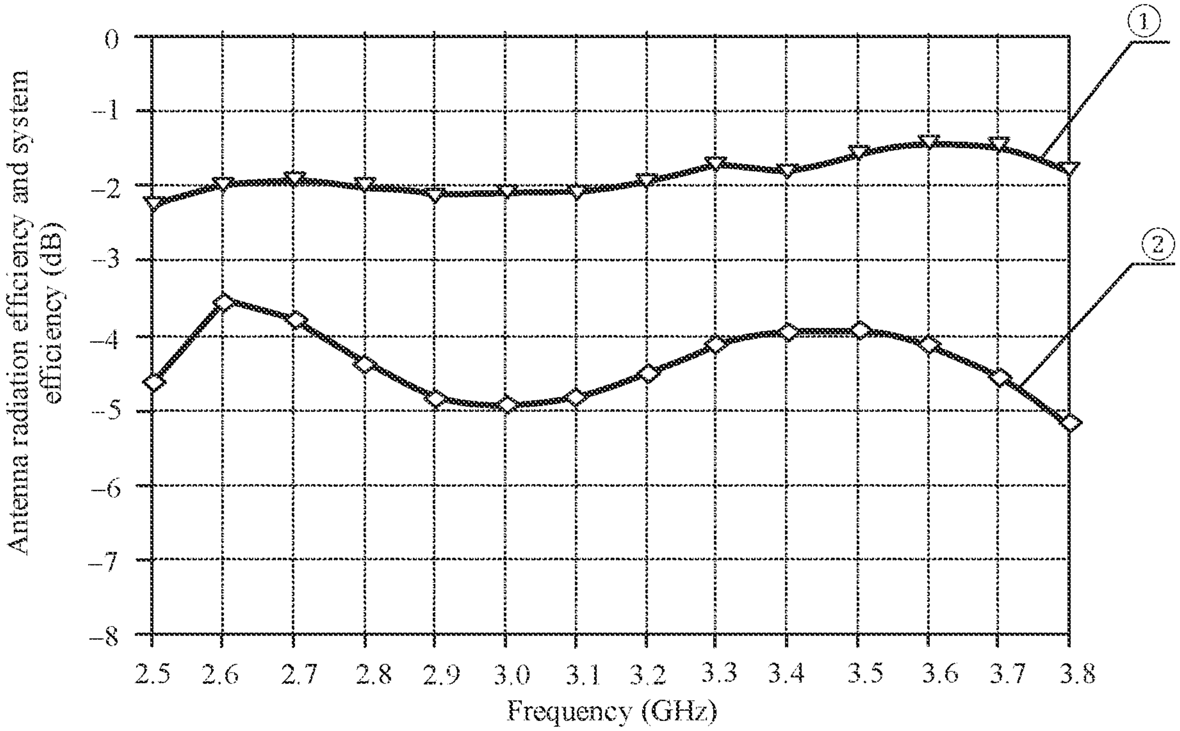
FIG. 15*a* is a curve graph in which antenna radiation efficiency and system efficiency change with a frequency according to an embodiment of this application.

In addition, under excitation of the first feed circuit 31, as shown in FIG. 15*a*, it can be seen from an antenna radiation efficiency curve ① of the antenna body 20 that radiation efficiency of the antenna body 20 is approximately −2 dB in the N41 frequency band (a frequency range of 2500 MHz to 2700 MHz) and the N78 frequency band (3300 MHz to 3800 MHz). Therefore, the antenna body 20 has high radiation efficiency. It can be seen from a system efficiency curve ② of the antenna body 20 that, when the antenna body 20 is in the N41 frequency band (a frequency range of 2500 MHz to 2700 MHz) and the N78 frequency band (3300 MHz to 3800 MHz), system efficiency of the antenna body 20 is higher than −6 dB, which indicates high system efficiency.

In addition, under excitation of the second feed circuit 32 shown in FIG. 13*c*, when the antenna body 20 works in the third radiation mode RM3, the first radiator 201 (including the first stub 211 and the second stub 221 in FIG. 13*c*) is used as a main radiator. In this case, when the length S1 of the first stub 211 and the length S2 of the second stub 221 are greater, a resonance frequency of the antenna body 20 in the third radiation mode RM3 is lower; or when the length S1 of the first stub 211 and the length S2 of the second stub 221 are smaller, a resonance frequency of the antenna body 20 in the third radiation mode RM3 is higher. Under excitation of the second feed circuit 32, when the antenna body 20 works in the fourth radiation mode RM4, when a capacitance value of the fifth capacitor C5 (or an inductance value of the third inductor L3) is larger, a resonance frequency of the antenna body 20 in the fourth radiation mode RM4 is lower; or when a capacitance value of the fifth capacitor C5 (or an inductance value of the third inductor L3) is smaller, a resonance frequency of the antenna body 20 in the fourth radiation mode RM4 is higher.

Based on this, when the structure size of the antenna body 20 remains unchanged, and a capacitance value of the fifth capacitor C5 is set to approximately 2 pF±0.5 pF, when the second feed circuit 32 excites the antenna body 20, radiation frequencies of the antenna body 20 used as the second antenna in the third radiation mode RM3 and the fourth radiation mode RM4 may cover the N78 frequency band (3300 MHz to 3800 MHz).

For example, as shown in FIG. 14, a curve ② is an S parameter curve of the antenna body 20 under excitation of the second feed circuit 32. It can be learned that a resonance frequency at a point b1 in the curve ② is approximately 3.3 GHz, and is in the N78 frequency band (3300 MHz to 3800 MHz).

In conclusion, when structures of the second configuration circuit 42 and the first configuration circuit 41 in the antenna apparatus 02 are set in a manner shown in FIG. 13*c*, the structure size of the antenna body 20 and the parameters of elements in the second configuration circuit 42 and the first configuration circuit 41 may be set, so that when the antenna body 20 can be used as the first antenna under excitation of the first feed circuit 31, the radiation frequency of the antenna in the first radiation mode RM1 may cover the N41 frequency band, and the first half of the N78 frequency band, and the radiation frequency in the second radiation mode RM2 may cover the second half of the N78 frequency band. In addition, when the antenna body 20 can be used as the second antenna under excitation of the second feed circuit 32, the radiation frequencies in the third radiation mode RM3 and the fourth radiation mode RM4 can cover the N78 frequency band. Isolation between the first antenna and the second antenna is high, and as shown in FIG. 14, the isolation may be 15 dB (a triangle location in the figure).

Figure 15B:
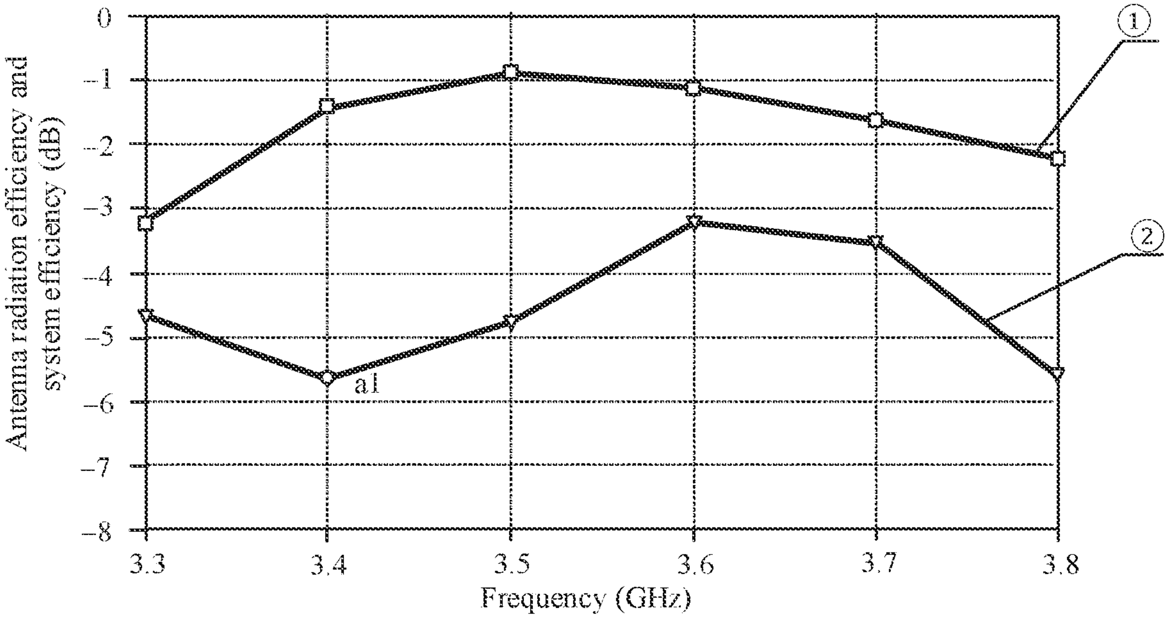
FIG. 15*b* is a curve graph in which antenna radiation efficiency and system efficiency change with a frequency according to an embodiment of this application.

In addition, under excitation of the second feed circuit 32, as shown in FIG. 15*b*, it can be seen from an antenna radiation efficiency curve ① of the antenna body 20 that radiation efficiency of the antenna body 20 is higher than −3 dB in the N78 frequency band (3300 MHz to 3800 MHz). Therefore, the antenna body 20 has high radiation efficiency. It can be seen from a system efficiency curve ② of the antenna body 20 that, when the antenna body 20 is in the N78 frequency band (3300 MHz to 3800 MHz), system efficiency of the antenna body 20 may be higher than −6 dB, which indicates high system efficiency.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An antenna apparatus, comprising:

a circuit board comprising a first surface, a first side edge, and a reference ground;

an antenna body comprising:

a first radiator comprising:

a first stub located on the first side edge and having a first end and a second end, wherein the second end is electrically connected to the reference ground; and a second stub located on the first side edge and having a third end and a fourth end, wherein the fourth end is electrically connected to the reference ground, wherein the first end of the first stub and the third end of the second stub do not touch and are opposite to each other, wherein a first gap formed between the first end of the first stub and the third end of the second stub, and wherein the first stub, the second stub, and the first side edge form a second gap; and a second radiator located on the circuit board and indirectly coupled to the first radiator, wherein the second radiator and the first surface of the circuit board form a third gap, and wherein a vertical projection of the second radiator is located on the first surface;

a first feed circuit electrically connected to the first stub and the second stub and configured to:

transmit equal-amplitude out-of-phase excitation signals to the first stub and the second stub; and excite the antenna body to generate a first radiation mode and a second radiation mode, wherein the first radiator is a main radiator in the first radiation mode, and wherein the second radiator is a main radiator in the second radiation mode; and a second feed circuit electrically connected to the first stub and the second stub and configured to:

transmit a same excitation signal to the first stub and the second stub; and excite the antenna body to generate a third radiation mode, wherein the first radiator is a main radiator in the third radiation mode.

2. The antenna apparatus of claim 1, wherein there is a distance D between the first radiator and the second radiator, and wherein D≤7 millimeters (mm).

3. The antenna apparatus of claim 1, wherein the circuit board further comprises a first excitation end, and wherein the first feed circuit comprises:

a signal conversion circuit comprising:

an input end electrically connected to the first excitation end;

a first output end electrically connected to the first stub; and a second output end electrically connected to the second stub, wherein the signal conversion circuit is configured to:

convert a signal provided by the first excitation end into a first excitation signal and a second excitation signal that are equal-amplitude out-of-phase;

transmit the first excitation signal to the first stub through the first output end; and transmit the second excitation signal to the second stub through the second output end; and a first configuration circuit electrically connected between the first output end and the second output end and configured to tune a resonance frequency and a bandwidth of the first radiator in the first radiation mode.

4. The antenna apparatus of claim 3, wherein the first configuration circuit comprises:

a first capacitor having a first end electrically connected to the first output end of the signal conversion circuit and a second end electrically connected to the first stub; and a second capacitor having a first end electrically connected to the second output end of the signal conversion circuit and a second end electrically connected to the second stub.

5. The antenna apparatus of claim 4, wherein the first configuration circuit comprises a first tuning component electrically connected between the second end of the first capacitor and the second end of the second capacitor, and wherein the first tuning component comprises a first inductor and a first radio frequency switch that are connected in series.

6. The antenna apparatus of claim 3, wherein the first configuration circuit comprises:

a third capacitor having a first end electrically connected to the first output end of the signal conversion circuit and a second end electrically connected to the first stub; and a fourth capacitor having a first end electrically connected to the second output end of the signal conversion circuit and a second end electrically connected to the second stub.

7. The antenna apparatus of claim 1, further comprising a second configuration circuit electrically connected to a center of the second radiator and the reference ground of the circuit board, wherein the second configuration circuit comprises a second tuning component electrically connected between the center of the second radiator and the reference ground of the circuit board, wherein the second tuning component comprises a second inductor and a second radio frequency switch that are connected in series, wherein the second feed circuit is further configured to excite the antenna body to generate a fourth radiation mode, wherein the second radiator is a main radiator in the fourth radiation mode, and wherein the second configuration circuit is configured to tune a resonance frequency and a bandwidth of the second radiator in the fourth radiation mode.

8. The antenna apparatus of claim 7, wherein in the first radiation mode, a flow direction of a current distributed on the first stub is the same as a flow direction of a current distributed on the second stub, wherein in the second radiation mode, flow directions of currents distributed on the second radiator are the same, wherein in the third radiation mode, a flow direction of a current distributed on the first stub is opposite to a flow direction of a current distributed on the second stub relative to the first gap, and wherein in the fourth radiation mode, flow directions of currents distributed on the second radiator are opposite to each other relative to the center of the second radiator.

9. The antenna apparatus of claim 7, wherein a frequency range covered by the first radiation mode, a frequency range covered by the second radiation mode, a frequency range covered by the third radiation mode, and a frequency range covered by the fourth radiation mode are at least partially different from each other.

10. The antenna apparatus of claim 1, wherein the second feed circuit is further configured to excite the antenna body to generate a fourth radiation mode, wherein the second radiator is a main radiator in the fourth radiation mode, wherein the antenna apparatus further comprises a second configuration circuit electrically connected to a center of the second radiator and the reference ground of the circuit board, wherein the second configuration circuit is configured to tune a resonance frequency and a bandwidth of the second radiator in the fourth radiation mode; and wherein the second configuration circuit comprises:

a fifth capacitor having a first end electrically connected to the center of the second radiator, and a second end grounded to the reference ground of the circuit board; or a third inductor having a first end electrically connected to the center of the second radiator, and a second end grounded to the reference ground of the circuit board.

11. The antenna apparatus of claim 10, wherein the first stub and the second stub are both L-shaped, and wherein the first stub and the second stub are disposed symmetrically with respect to a center of the first gap.

12. The antenna apparatus of claim 11, wherein the second radiator is strip-shaped, and wherein the first stub and the second stub are symmetrically disposed with respect to the center of the second radiator.

13. The antenna apparatus of claim 12, wherein a current on the antenna body in the first radiation mode is orthogonal to currents on the antenna body in the third radiation mode and the fourth radiation mode, wherein a radio wave on the antenna body in the first radiation mode is orthogonal to radio waves on the antenna body in the third radiation mode and the fourth radiation mode, wherein a current on the antenna body in the second radiation mode is orthogonal to currents on the antenna body in the third radiation mode and the fourth radiation mode, and wherein a radio wave on the antenna body in the second radiation mode is orthogonal to radio waves on the antenna body in the third radiation mode and the fourth radiation mode.

14. The antenna apparatus of claim 10, wherein in the first radiation mode, a flow direction of a current distributed on the first stub is the same as a flow direction of a current distributed on the second stub, wherein in the second radiation mode, flow directions of currents distributed on the second radiator are the same, wherein in the third radiation mode, a flow direction of a current distributed on the first stub is opposite to a flow direction of a current distributed on the second stub relative to the first gap, and wherein in the fourth radiation mode, flow directions of currents distributed on the second radiator are opposite to each other relative to the center of the second radiator.

15. The antenna apparatus of claim 10, wherein a frequency range covered by the first radiation mode, a frequency range covered by the second radiation mode, a frequency range covered by the third radiation mode, and a frequency range covered by the fourth radiation mode are at least partially different from each other.

16. The antenna apparatus of claim 1, further comprising an antenna chassis disposed on the first surface of the circuit board, wherein a height of the antenna chassis is the same as the third gap and a height direction of the antenna chassis is perpendicular to the first surface, wherein the antenna chassis comprises an insulation material and wherein the second radiator is disposed on a surface of a side that is of the antenna chassis and that is away from the first surface.

17. An electronic device, comprising:

a metal rim; and an antenna apparatus comprising:

a circuit board having a first surface and a first side edge;

an antenna body comprising:

a first radiator being part of the metal rim and comprising:

a first stub located on the first side edge and having a first end and a second end; and a second stub located on the first side edge and having a third end and a fourth end, wherein the first end of the first stub and the third end of the second stub do not touch and are opposite to each other, wherein a first gap is formed between the first end of the first stub and the third end of the second stub, and wherein the first stub, the second stub, and the first side edge form a second gap; and a second radiator located on the circuit board and indirectly coupled to the first radiator, wherein the second radiator and the first surface of the circuit board form a third gap, wherein a vertical projection of the second radiator is located on the first surface, and wherein the second end of the first stub and the fourth end of the second stub are electrically connected to a reference ground of the circuit board separately;

a first feed circuit electrically connected to the first stub and the second stub, wherein the first feed circuit is configured to:

transmit equal-amplitude out-of-phase excitation signals to the first stub and the second stub respectively; and excite the antenna body to generate a first radiation mode and a second radiation mode, wherein the first radiator is a main radiator in the first radiation mode, and wherein the second radiator is a main radiator in the second radiation mode; and a second feed circuit electrically connected to the first stub and the second stub, wherein the second feed circuit is configured to:

transmit a same excitation signal to the first stub and the second stub; and excite the antenna body to generate a third radiation mode, wherein the first radiator is a main radiator in the third radiation mode.

18. The electronic device of claim 17, wherein there is a distance D between the first radiator and the second radiator, and wherein $D \leq 7$ millimeters (mm).

19. The electronic device of claim 17, wherein the first stub and the second stub are both L-shaped, and wherein the first stub and the second stub are disposed symmetrically with respect to a center of the first gap.

20. The electronic device of claim 19, wherein the second radiator is strip-shaped, and wherein the first stub and the second stub are symmetrically disposed with respect to the center of the second radiator.

* * * * *